US012709243B2

(12) United States Patent
Ishigaki et al.

(10) Patent No.: US 12,709,243 B2
(45) Date of Patent: Aug. 18, 2026

(54) AIRBAG DEVICE FOR VEHICLE

(71) Applicant: AUTOLIV DEVELOPMENT AB, Vargarda (SE)

(72) Inventors: Ryota Ishigaki, Kanagawa (JP); Yumi Shiga, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/868,617

(22) PCT Filed: May 1, 2023

(86) PCT No.: PCT/JP2023/017034
§ 371 (c)(1),
(2) Date: Sep. 16, 2025

(87) PCT Pub. No.: WO2023/228690
PCT Pub. Date: Nov. 30, 2023

(65) Prior Publication Data

US 2026/0001507 A1 Jan. 1, 2026

(30) Foreign Application Priority Data

May 27, 2022 (JP) ................................ 2022-087174

(51) Int. Cl.
*B60R 21/2338* (2011.01)
*B60R 21/203* (2006.01)
(Continued)

(52) U.S. Cl.
CPC ...... *B60R 21/2338* (2013.01); *B60R 21/2032* (2013.01); *B60R 21/237* (2013.01); *B60R 2021/23382* (2013.01); *B60R 21/26* (2013.01)

(58) Field of Classification Search
CPC ........... B60R 21/2338; B60R 21/2032; B60R 21/237; B60R 21/26; B60R 2021/23382
(Continued)

(56) References Cited

U.S. PATENT DOCUMENTS 6,086,096 A * 7/2000 Link .................. B60R 21/2338 280/743.1
7,021,657 B2 * 4/2006 Kassman .......... B60R 21/01512 280/743.2
(Continued)

FOREIGN PATENT DOCUMENTS

JP 7-017351 A 1/1995
JP 2019-123275 A 7/2019
(Continued)

*Primary Examiner* — Toan C To
(74) *Attorney, Agent, or Firm* — Foley & Lardner LLP

(57) ABSTRACT

An airbag cushion of a vehicle airbag device has a bottom surface into which the inflator is inserted, a restraining surface on the occupant side, a side surface connecting the bottom surface and the restraining surface, a recess part formed in a prescribed range in the center of the restraining surface and recessed toward the bottom surface side, and one or more tethers stretched between the recess part and the bottom surface. The recess part is formed by being pulled toward the bottom surface side by the tether during expansion and deployment. The airbag cushion further has folds and restraining parts formed along the imaginary line on the inner wall of the recess part during inflation and deployment.

17 Claims, 13 Drawing Sheets

(51) Int. Cl.
*B60R 21/237* (2006.01)
*B60R 21/26* (2011.01)

(58) Field of Classification Search
USPC ............................................. 280/731, 743.1
See application file for complete search history.

(56) References Cited

U.S. PATENT DOCUMENTS

| | | | | |
|---|---|---|---|---|
| 9,738,242 | B2 * | 8/2017 | Ishiguro | B60R 21/203 |
| 10,899,309 | B2 * | 1/2021 | Hotta | B60R 21/233 |
| 10,919,483 | B2 * | 2/2021 | Hotta | B60R 21/216 |
| 11,135,991 | B2 * | 10/2021 | Ishigaki | B60R 21/2338 |
| 12,319,223 | B2 * | 6/2025 | Jang | B60R 21/235 |
| 2004/0090055 | A1 * | 5/2004 | Kassman | B60R 21/01512 280/743.2 |
| 2004/0119271 | A1 * | 6/2004 | Webber | B60R 21/2338 280/743.1 |
| 2019/0217806 | A1 * | 7/2019 | Hotta | B60R 21/2338 |
| 2020/0070762 | A1 * | 3/2020 | Ishigaki | B60R 21/203 |
| 2020/0307499 | A1 * | 10/2020 | Nonoyama | B60R 21/2338 |

FOREIGN PATENT DOCUMENTS

| | | | |
|---|---|---|---|
| JP | 2019-142338 | A | 8/2019 |
| JP | 2020-037382 | A | 3/2020 |
| JP | 2020-045030 | A | 3/2020 |
| WO | 2017/090772 | A1 | 6/2017 |
| WO | 2019/194102 | A1 | 10/2019 |

* cited by examiner

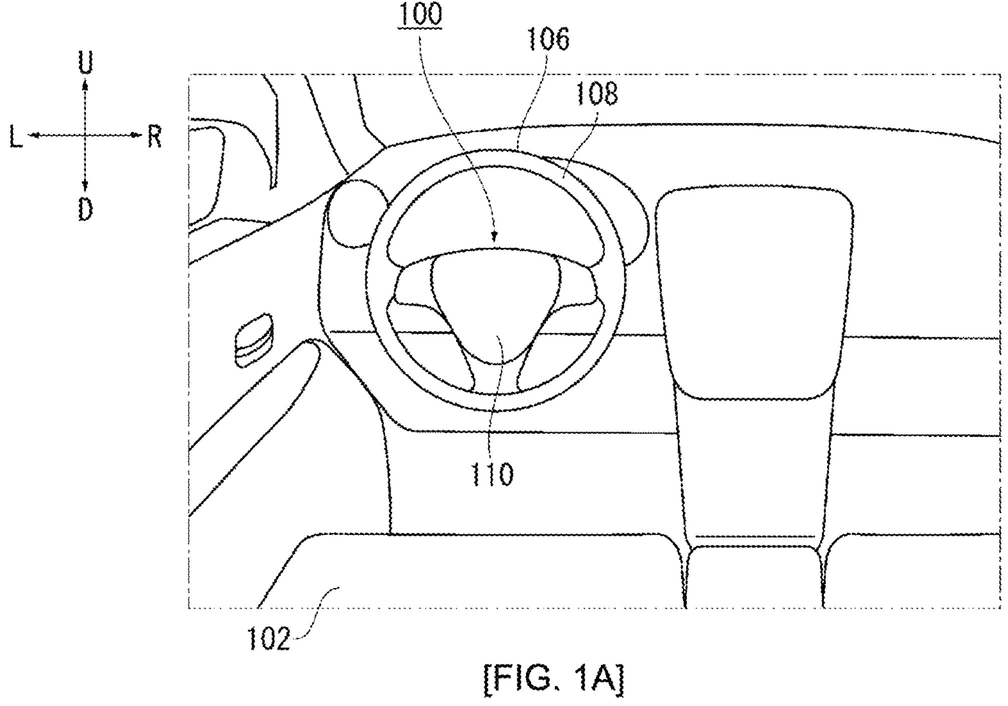
[FIG. 1A]
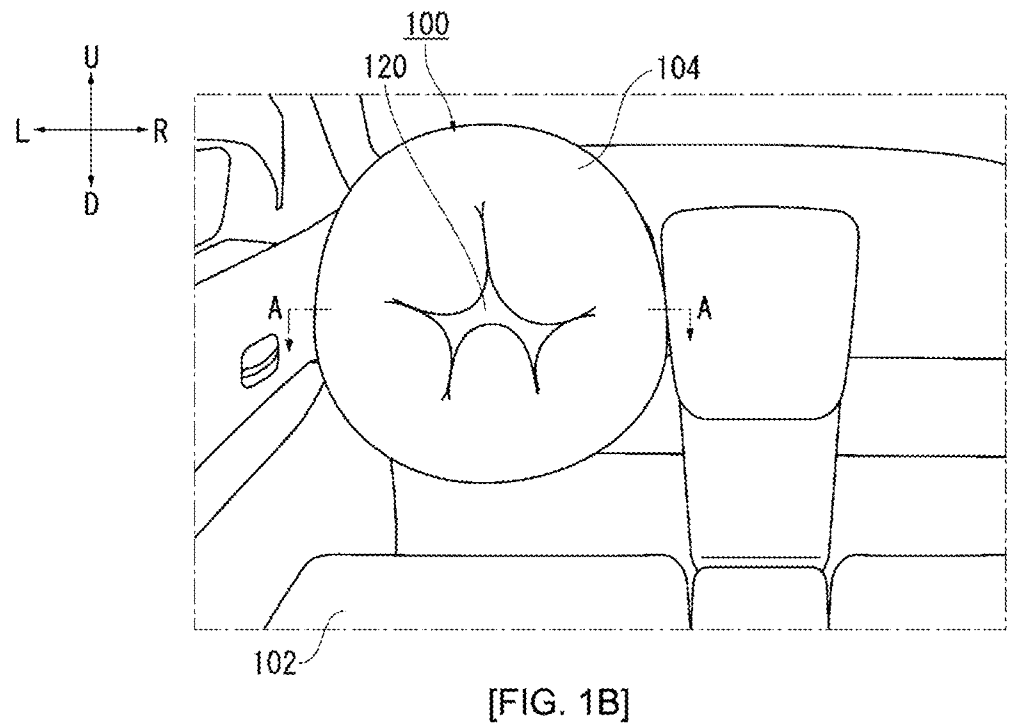
[FIG. 1B]

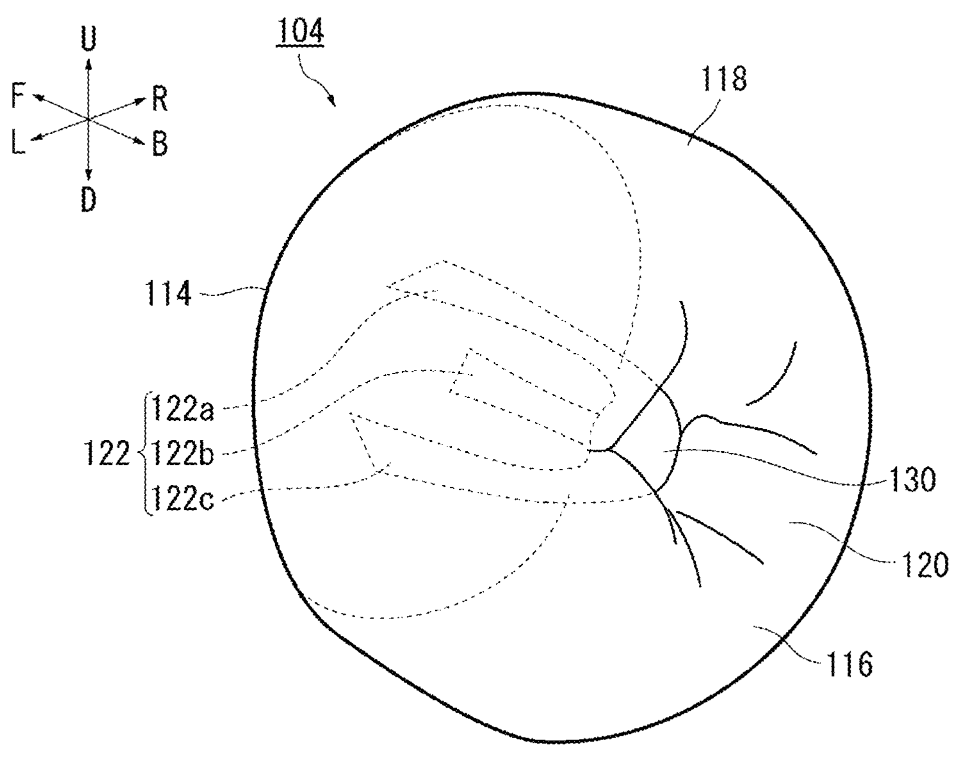
[FIG. 2A]
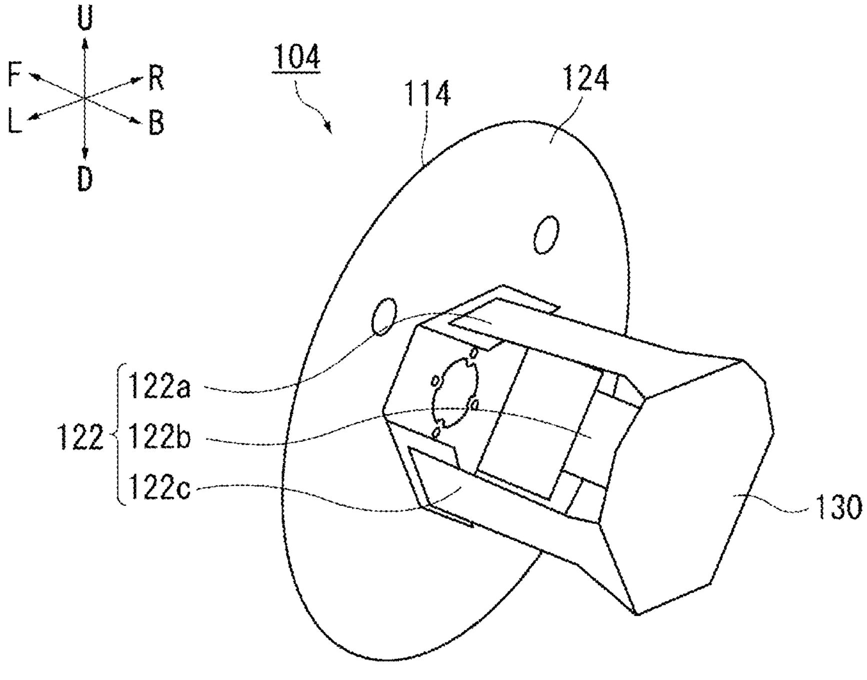
[FIG. 2B]

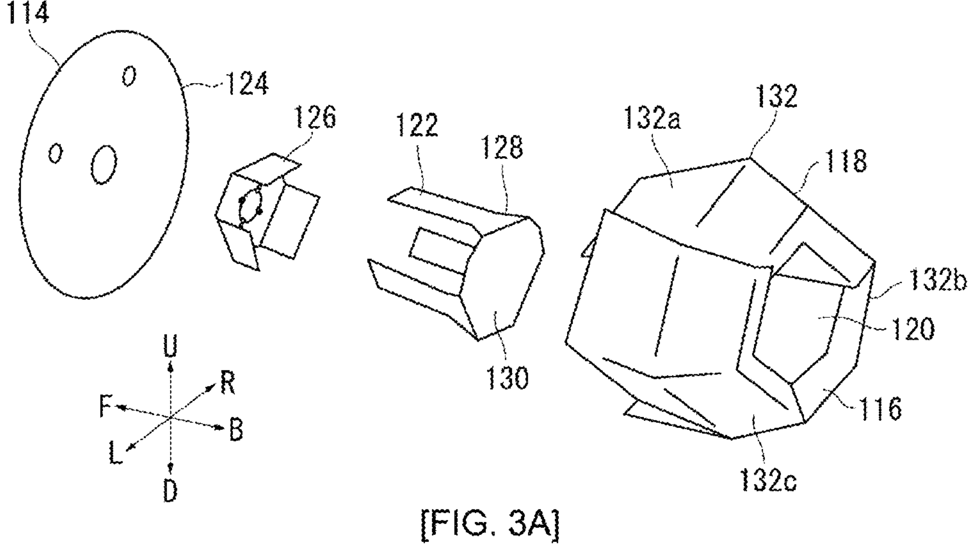
[FIG. 3A]
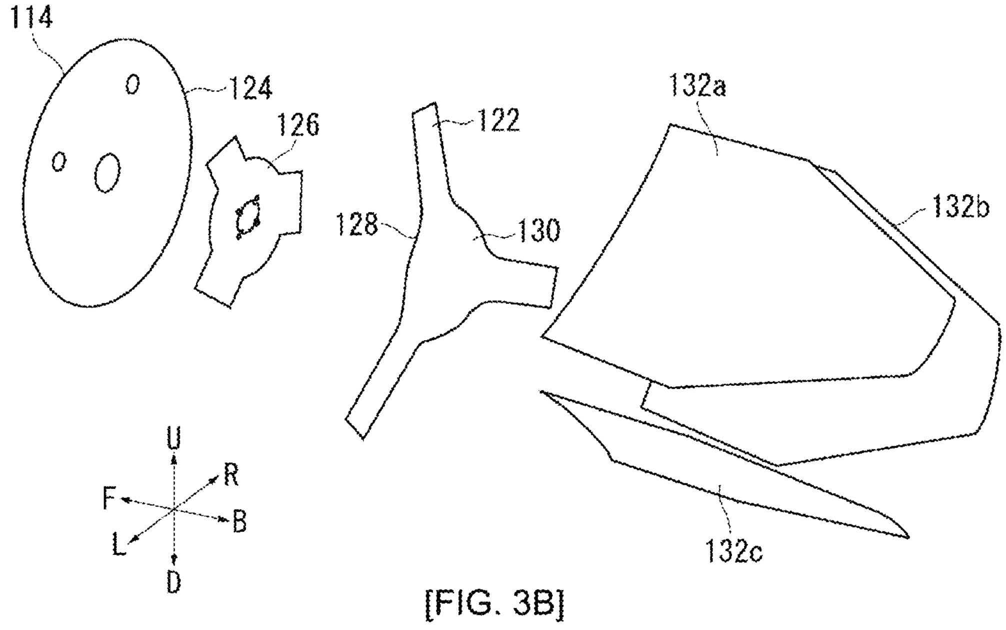
[FIG. 3B]

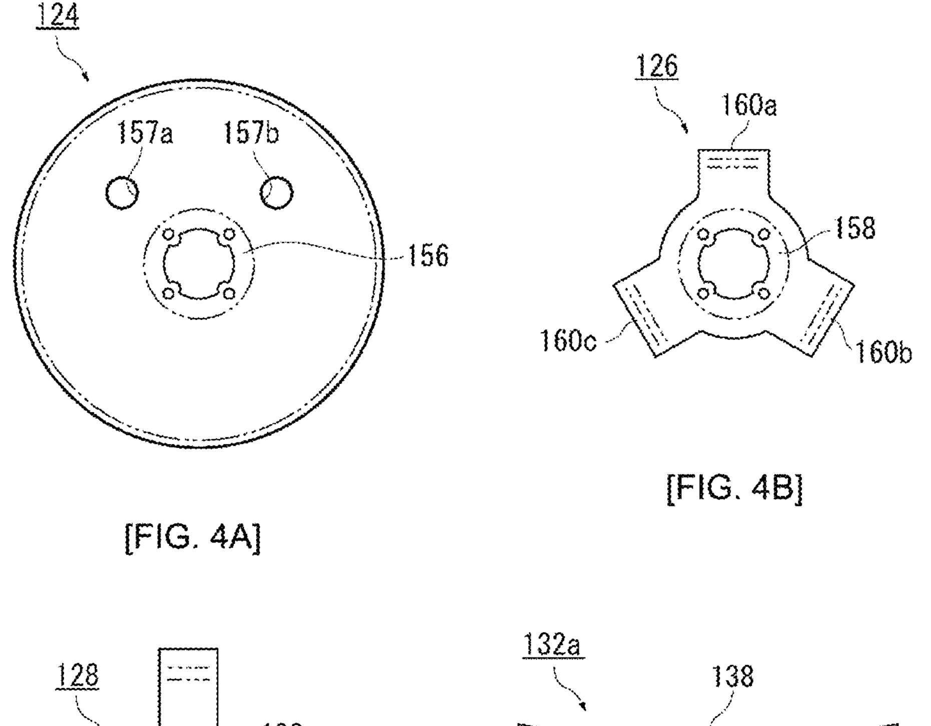
[FIG. 4A]
[FIG. 4B]
[FIG. 4C]
[FIG. 4D]

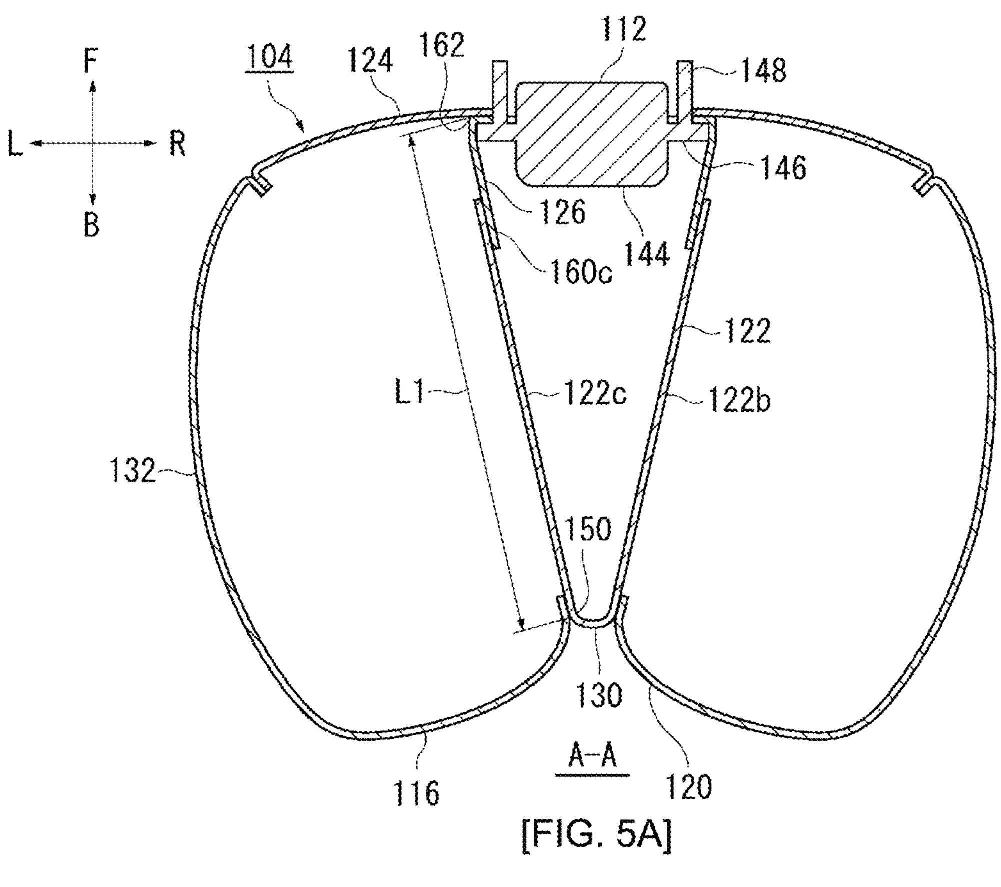
[FIG. 5A]
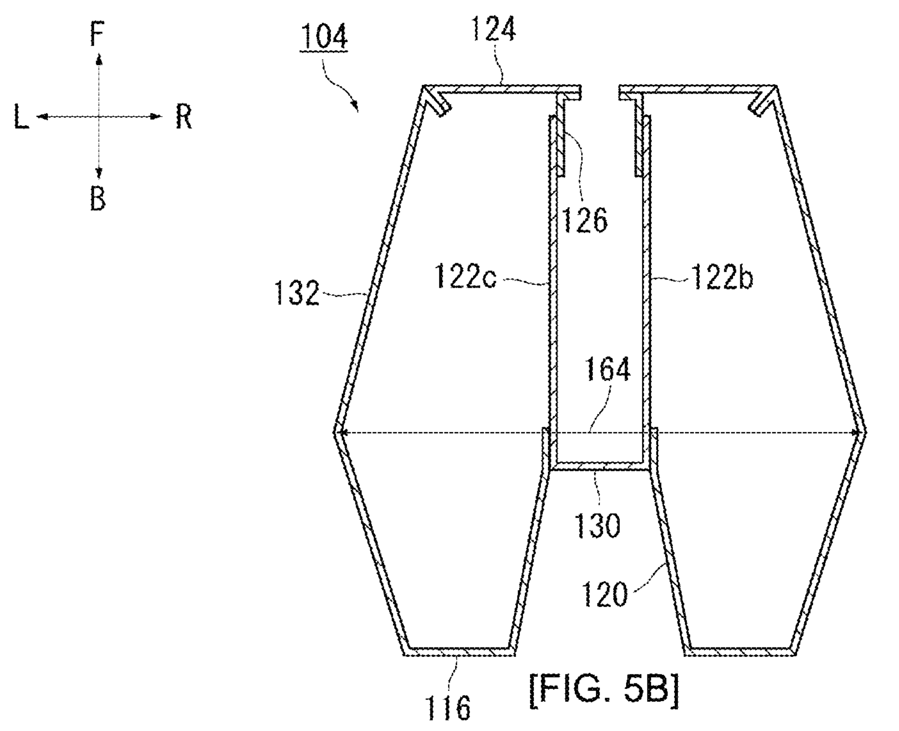
[FIG. 5B]

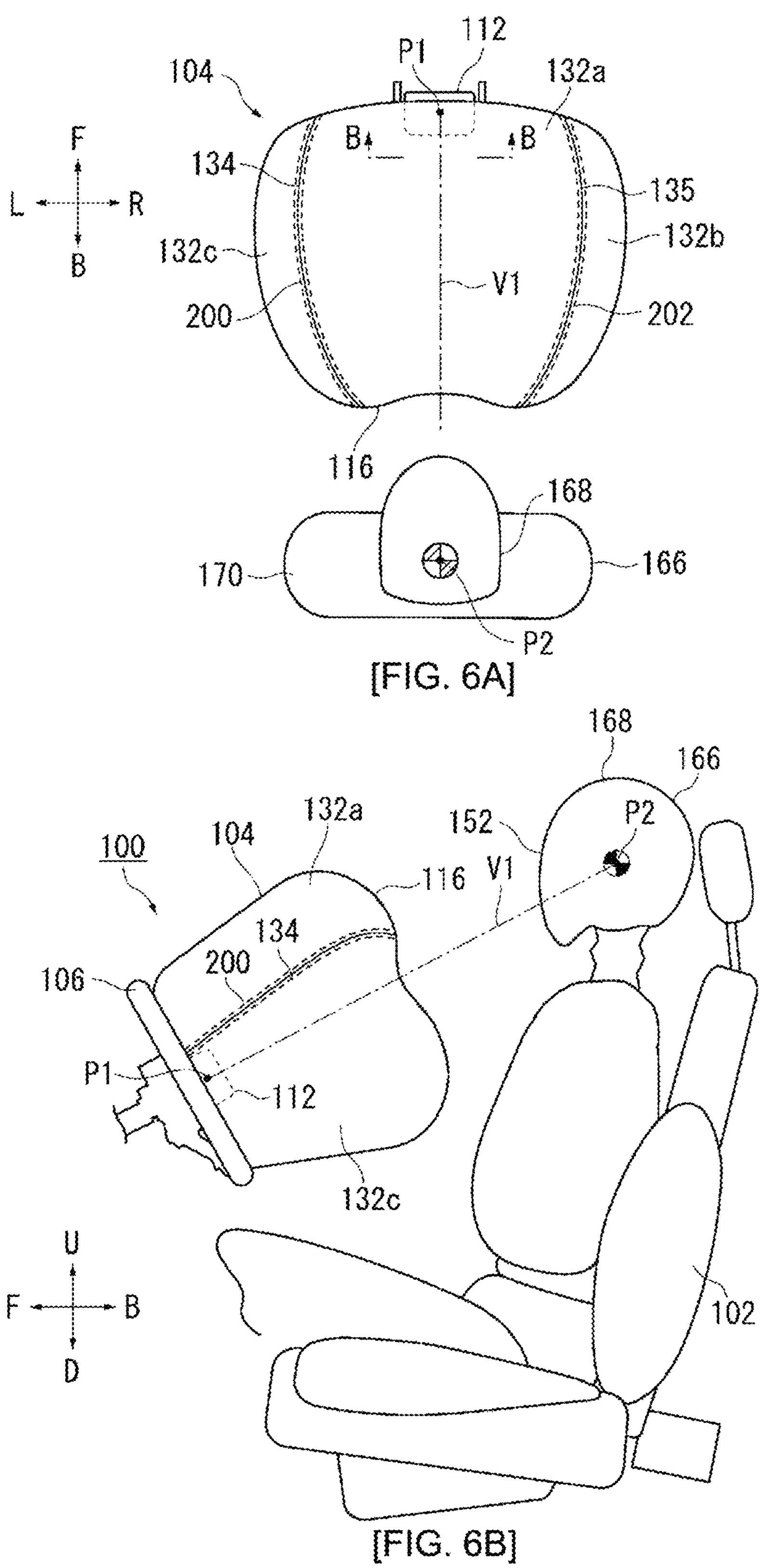
[FIG. 6A]
[FIG. 6B]

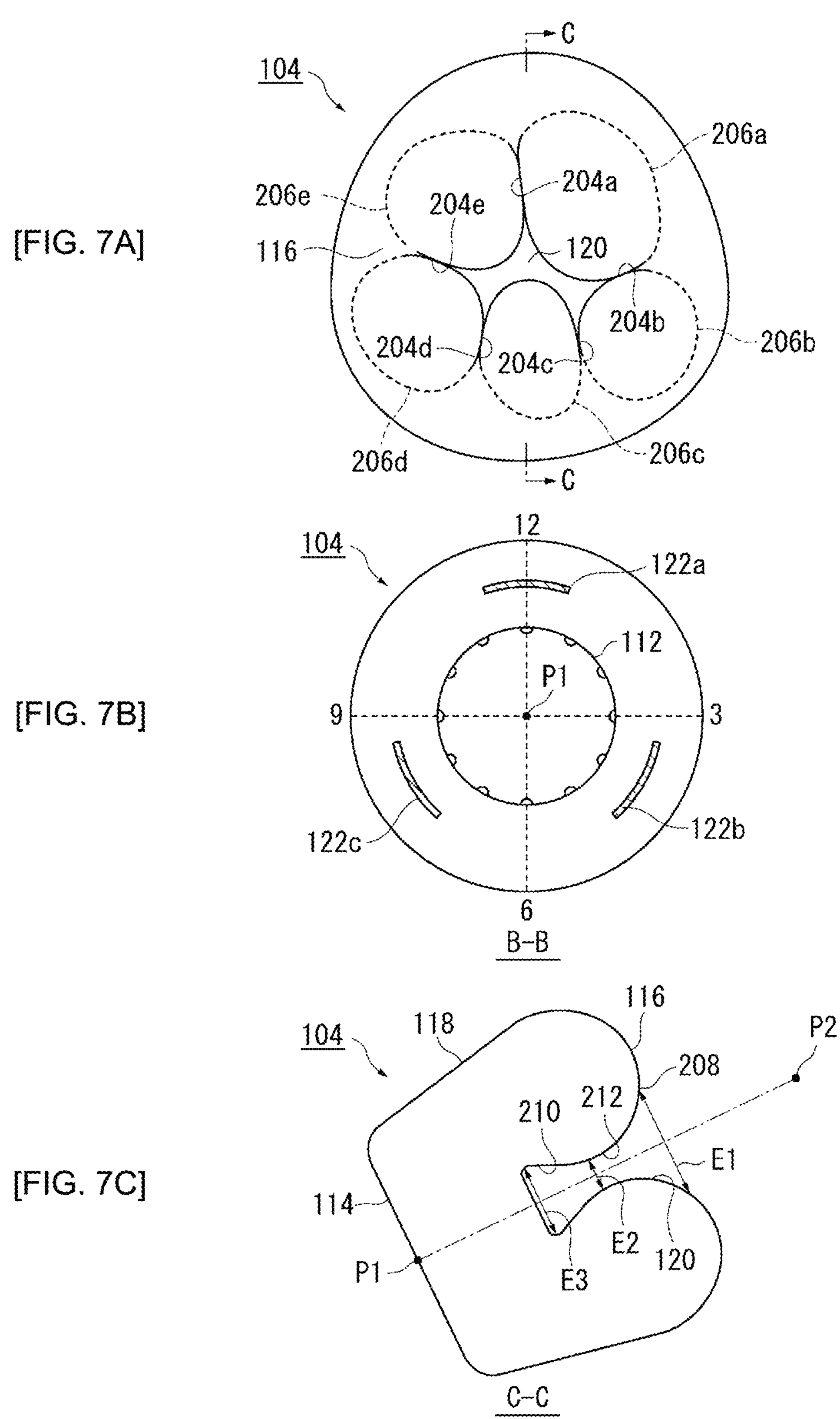
[FIG. 7A]
104
C
C
206a
206e
204a
204e
116
120
204b
206b
204d
204c
206d
206c
[FIG. 7B]
104
12
122a
112
P1
9
3
122c
122b
6
B-B
[FIG. 7C]
104
118
116
P2
208
210
212
E1
114
E2
120
P1
E3
C-C

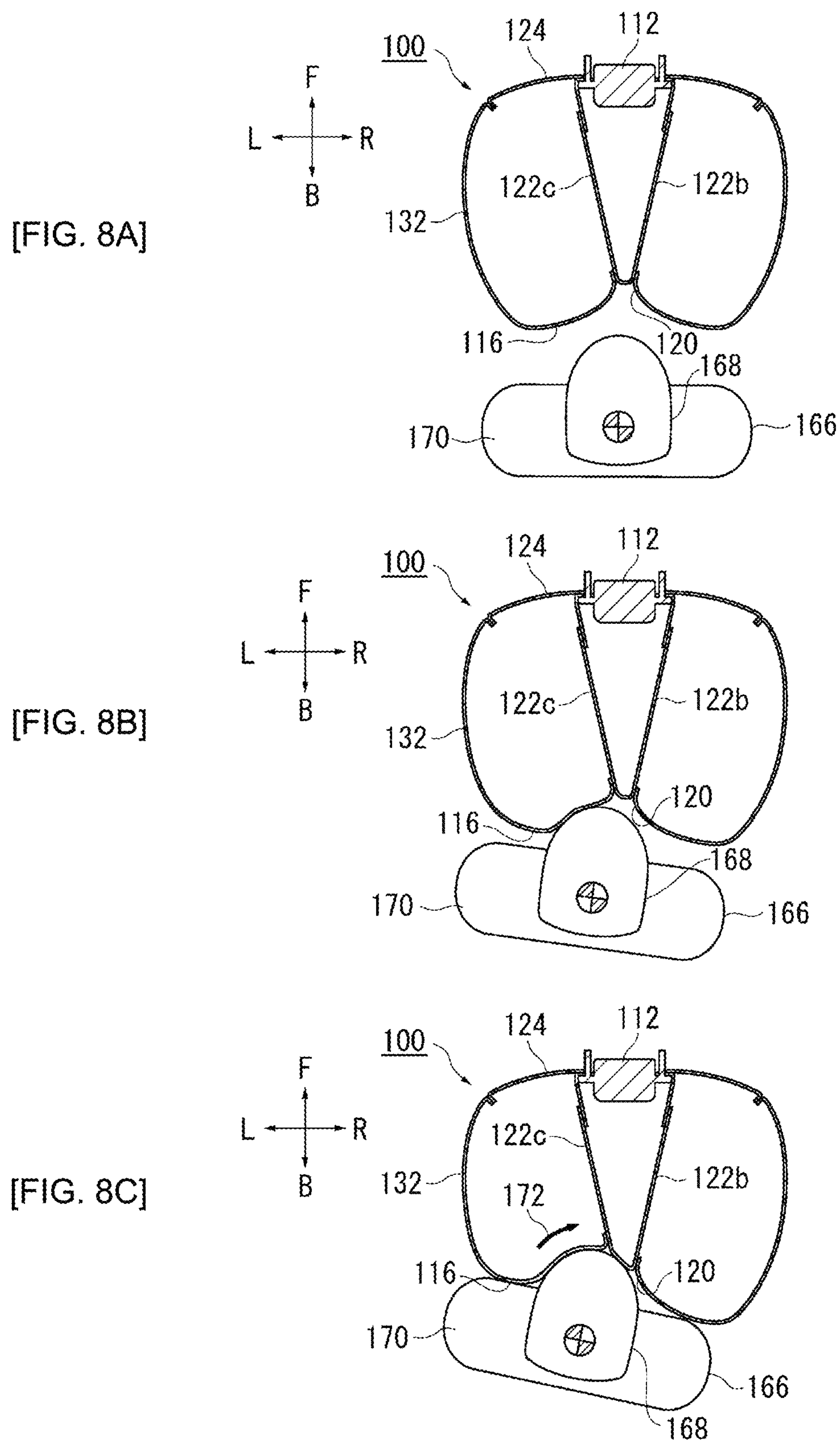
[FIG. 8A]
100
124
112
F
L
R
B
122c
122b
132
116
120
168
170
166
[FIG. 8B]
100
124
112
F
L
R
B
122c
122b
132
120
116
168
170
166
[FIG. 8C]
100
124
112
F
L
R
B
122c
132
122b
172
116
120
170
166
168

[FIG. 9A]
[FIG. 9B]
[FIG. 9C]
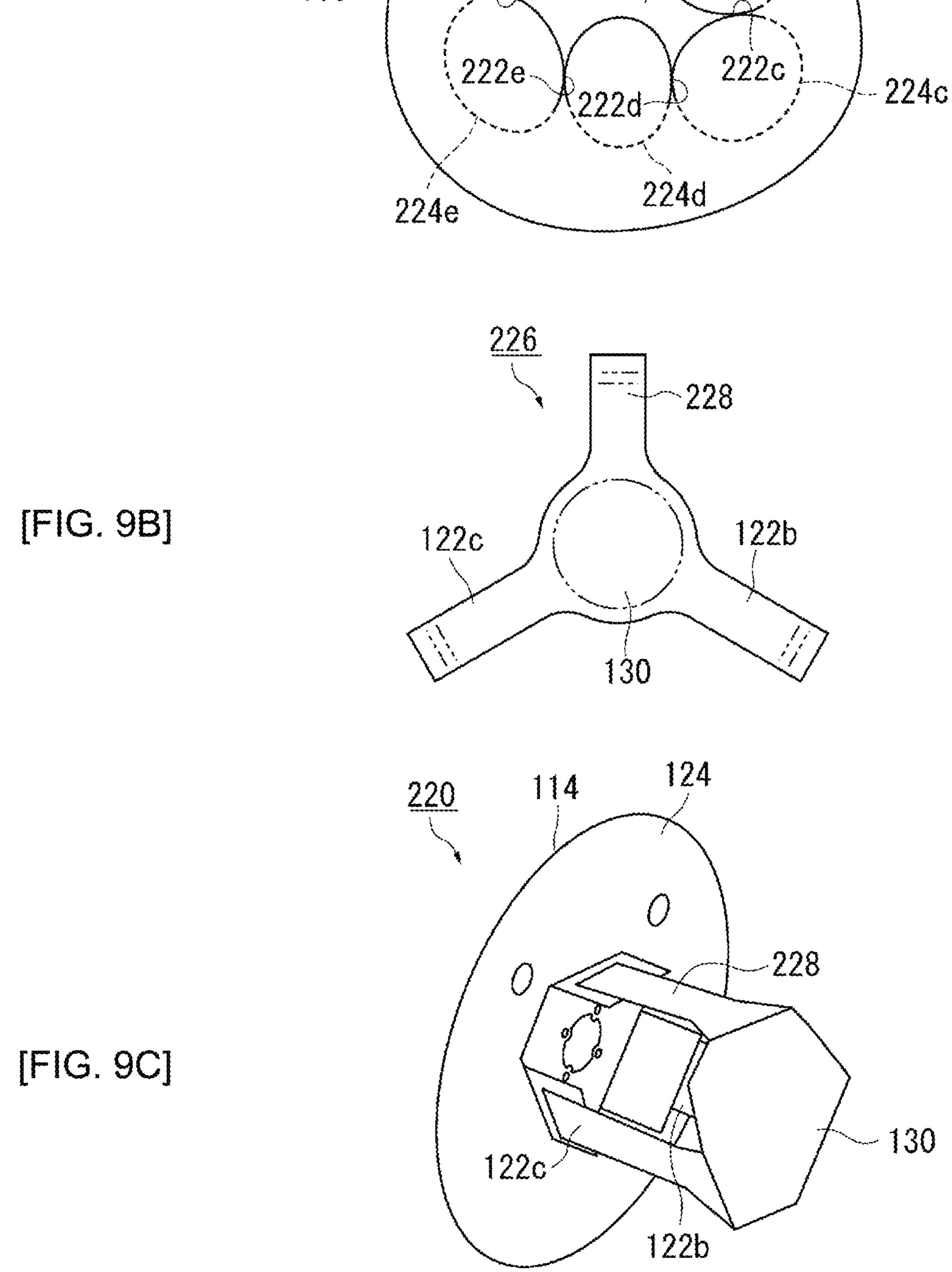

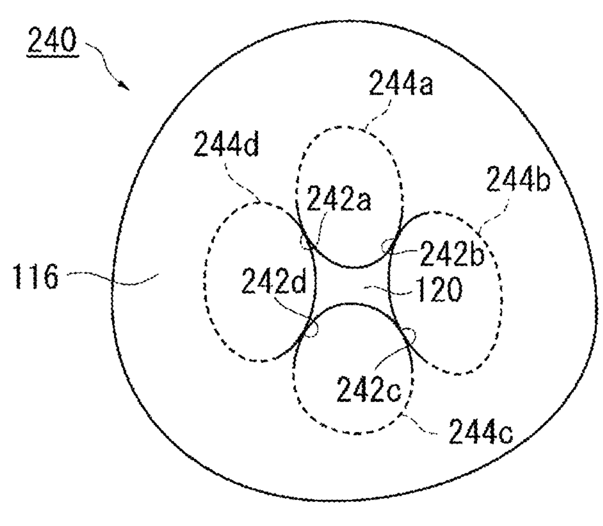
[FIG. 10A]
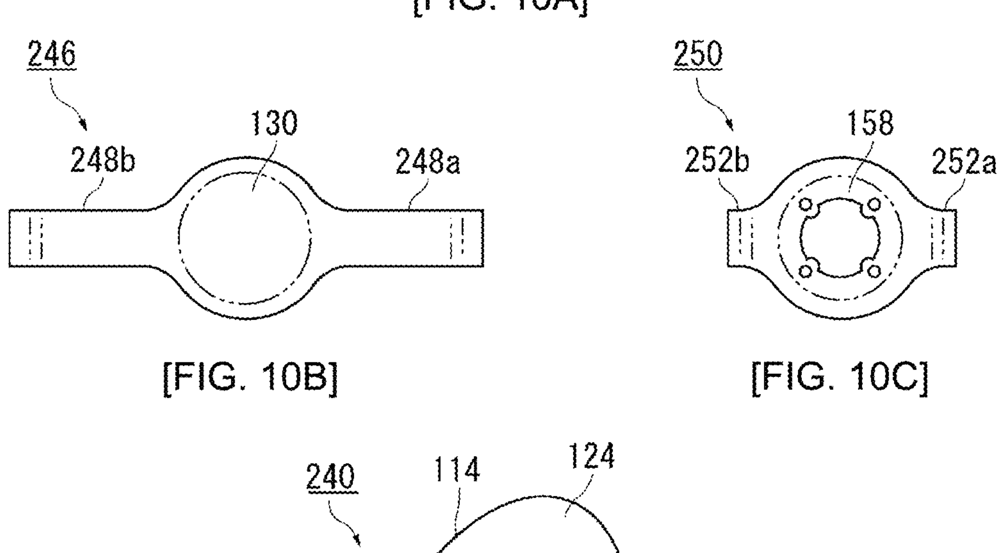
[FIG. 10B]
[FIG. 10C]
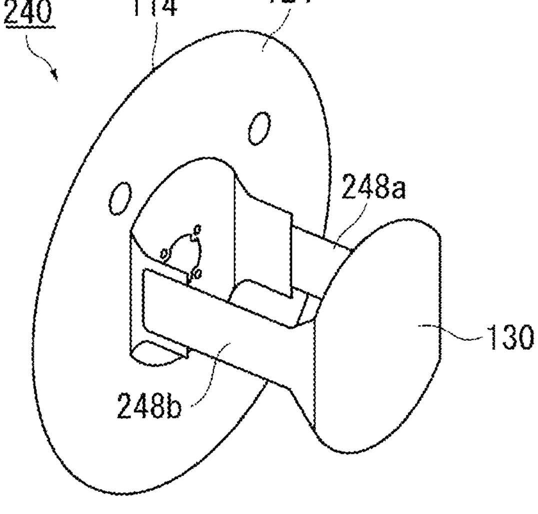
[FIG. 10D]

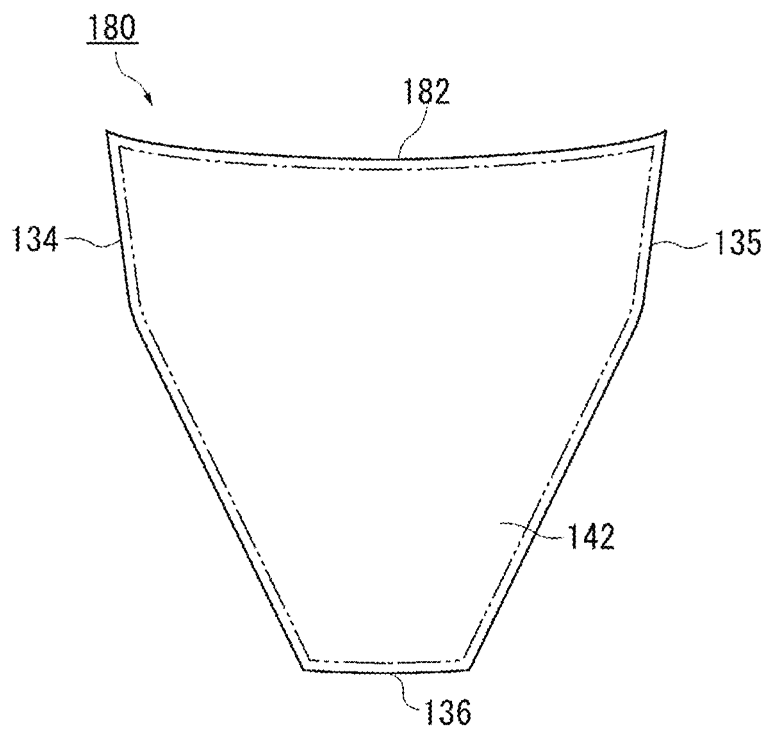
[FIG. 11A]
190
138
192
140
194
142
136
[FIG. 11B]

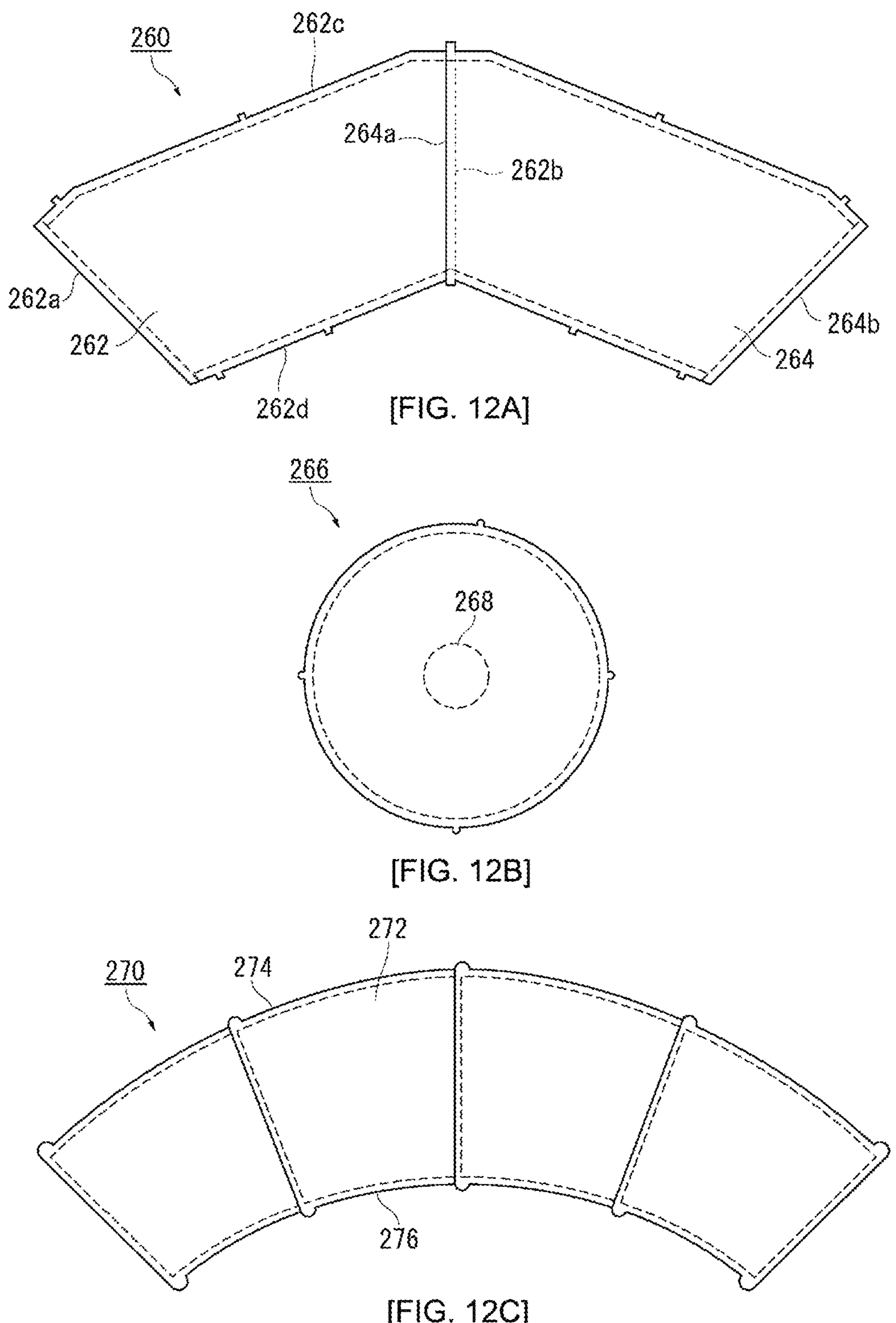
[FIG. 12A]
[FIG. 12B]
[FIG. 12C]

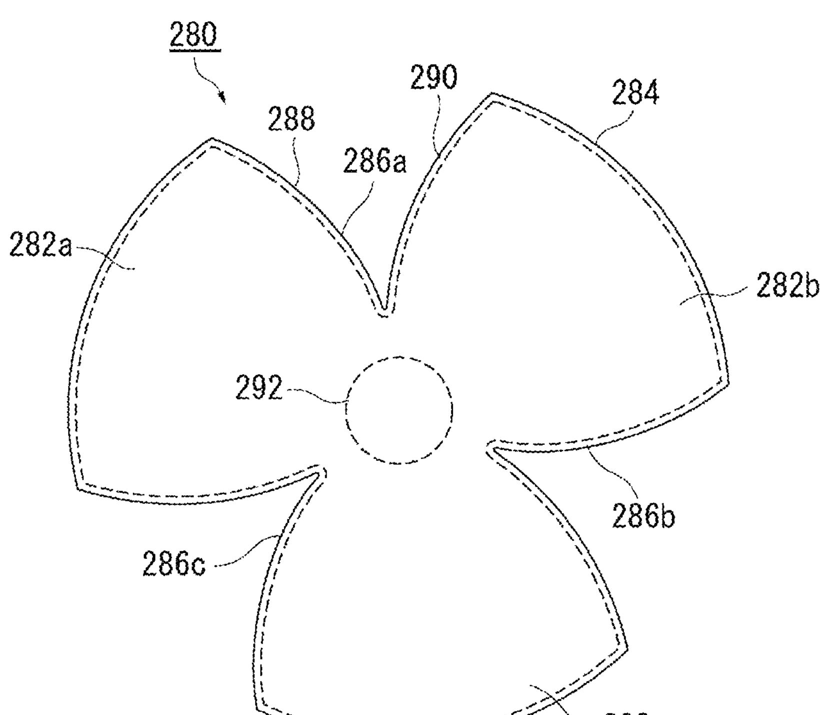
[FIG. 13A]
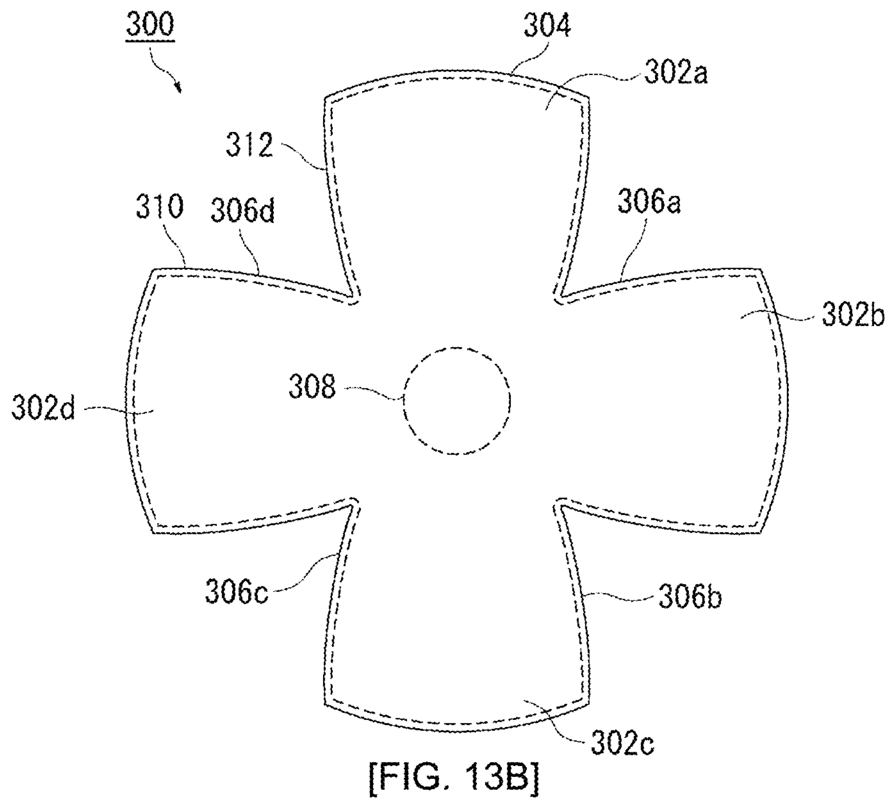
[FIG. 13B]

AIRBAG DEVICE FOR VEHICLE

TECHNICAL FIELD

The present invention relates to a vehicle airbag device for restraining an occupant in an emergency.

BACKGROUND ART

Airbag devices have generally become standard equipment in vehicles in recent years. For example, many vehicles are equipped with a driver airbag in their steering wheels. The airbag cushion of the driver seat airbag device is primarily stored in a center portion of a steering wheel and cleaves a resin cover and the like by expansion pressure, so as to expand and deploy toward the front of an occupant.

More efficient restraint of an occupant is desired for the airbag cushion described above. The inventors of the present application focused on the fact that, based on body structure, rotation of a head of the occupant tends to cause strain on the body, and have developed an airbag cushion that enables efficient restraint while suppressing rotation of the head of the occupant.

For example, it has been found that in the case of an oblique collision that is a collision at an angle relative to the direction of travel, the occupant enters the airbag cushion at an angle and the head easily rotates. In light of the forgoing, the present applicant has developed technology for forming a recess part 120 using an internal tether 122 at the center of an airbag cushion 104 on the occupant side as disclosed in FIG. 2 of Patent Document 1, for example.

RELATED ART DOCUMENTS

Patent Documents

Patent Document 1: Japanese Unexamined Patent Application Publication 2020-37382

SUMMARY OF THE INVENTION

Problem to be Solved by the Invention

With the technology of Patent Document 1, a center base material 118, three internal tethers 122, and the like are used to form a recess part 120. Currently, development is underway on technology that can form the recess part more efficiently, and further reduce the burden on an occupant when restrained.

In light of the foregoing, an object of the present invention is to provide a vehicle airbag device that can suppress injury values of the occupant by using a simple configuration.

Means for Solving the Problem

In order to resolve the aforementioned problems, a typical configuration of the vehicle airbag device of the present invention contains an airbag cushion that is inflated and deployed between a structure in a vehicle cabin and an occupant seated in a seat in the event of an emergency, and an inflator that is installed on the structure, the airbag cushion containing: a bottom surface into which the inflator is inserted; a restraining surface on an occupant side; a side surface connecting the bottom surface and the restraining surface; a recess part formed in a prescribed range at a center of the restraining surface recessed toward the bottom surface side; and one or more tethers extending between the recess part and the bottom surface side; wherein the recess part is pulled toward the bottom surface side by the tether during the inflation and deployment, the airbag cushion further containing: a plurality of folds formed on an inner wall of the recess part along the imaginary line during inflation and deployment; and a plurality of restraining parts formed radially so as to divide the inner wall in an inner circumferential direction by the plurality of folds during inflation and deployment.

With the above configuration, a recess part is formed in the center of the restraining surface, so when an occupant enters the airbag cushion at an angle due to an oblique collision or the like, rotation of the head, for example, can be suppressed compared to when the occupant is simply restrained on a flat surface. In particular, in the aforementioned configuration, folds and restraining parts are formed on the inner wall of the recess part by being pulled to the inside of the airbag cushion by the tether. With this restraining part, the occupant can be restrained more softly, and therefore the injury level of the occupant can be further reduced.

The recess part can contain: an inlet on an occupant side; a middle bottom part on the bottom surface side; and an intermediate part formed at a prescribed location between the inlet and the middle bottom part; wherein in a cross-section perpendicular to the imaginary line of the airbag cushion, the space inside the intermediate part can be narrower than the spaces inside the inlet and the inner bottom part.

The recess part has a configuration with an intermediate part that extends inward. The intermediate part has a small radius of curvature and low tension, so the occupant can be restrained with less burden.

The one or more tethers may be provided in plurality, and the plurality of tethers may be provided at three locations around the periphery of the inflator in the cross-section.

The folds and the restraining part can be efficiently formed by pulling the recess part with the tether.

When the cross-section is viewed as a clock, at least one of the plurality of tethers can be provided near the 12 o'clock position and the other tethers can be provided between the 3 o'clock and 9 o'clock positions.

The aforementioned tether can also be used to efficiently form the folds and restraining parts by pulling the recess part.

The tether located near the 12 o'clock position may be shorter in dimension than the other tethers.

The aforementioned tether can also be used to efficiently form the folds and restraining parts by pulling the recess part.

The plurality of tethers may be the same length.

The aforementioned tether can also be used to efficiently form the folds and restraining parts by pulling the recess part.

The one or more tethers may be provided in plurality, and the plurality of tethers may be provided at positions that divide the periphery of the inflator into three equal parts in the cross-section.

The aforementioned tether can also be used to efficiently form the folds and restraining parts by pulling the recess part.

When the cross-section is viewed as a clock, at least one of the plurality of tethers can be provided near the 12 o'clock position and the other tethers can be provided between the 3 o'clock and 9 o'clock positions.

The aforementioned tether can also be used to efficiently form the folds and restraining parts by pulling the recess part.

The tether located near the 12 o'clock position may be shorter in dimension than the other tethers.

The aforementioned tether can also be used to efficiently form the folds and restraining parts by pulling the recess part.

The plurality of tethers may be the same length.

The aforementioned tether can also be used to efficiently form the folds and restraining parts by pulling the recess part.

The one or more tethers may be provided in plurality, and the plurality of tethers may be provided in positions facing each other with the inflator at the center in the cross-section.

The aforementioned tether can also be used to efficiently form the folds and restraining parts by pulling the recess part.

The plurality of tethers may be provided near the 12 o'clock position and the 6 o'clock position when the cross-section is viewed as a clock.

The aforementioned tether can also be used to efficiently form the folds and restraining parts by pulling the recess part.

The plurality of tethers may be provided near the 3 o'clock position and the 9 o'clock position when the cross-section is viewed as a clock.

The aforementioned tether can also be used to efficiently form the folds and restraining parts by pulling the recess part.

A range extending from the side surface of the airbag cushion to at least a part of the restraining surface can be formed by a prescribed side panel; the side panel can include a plurality of subpanels divided in the circumferential direction of the side surface;

each of the plurality of subpanels can contain: a pair of side edges joined to adjacent subpanels; a first edge on the restraining surface side; and a second edge on the bottom surface side; and the pair of side edges can be joined to adjacent subpanels by sewing along an imaginary line connecting the geometric center of the inflator and the center of the head of the occupant during inflation and deployment of the airbag cushion.

In the aforementioned configuration, the plurality of subpanels constituting the side surface and recess part of the airbag cushion are joined by sewing along an imaginary line connecting the inflator and the head of the occupant. The stitching along the imaginary line is able to absorb a force acting in a perpendicular direction to the airbag cushion tending to expand in the circumferential direction, as seen by the occupant. As a result, the tension in the subpanel is reduced, and furthermore, the subpanel is pulled to the inside of the airbag cushion by the tether, forming folds and a restraining part on the inner wall of the recess part. With this restraining part, the occupant can be restrained more softly, and therefore the injury level of the occupant can be further reduced.

The first edge on the restraining surface side may be shorter than the second edge on the bottom surface side.

In the above configuration, the first edge of the subpanel on the restraining surface side is shorter than the second edge on the bottom surface side, so that when the side edges of the subpanel are connected to form a side panel, the side panel has a narrowed shape on the restraining surface side. The side panel allows the recess part to be efficiently formed on the restraining surface. In addition, the side panel has a simple configuration and requires use of less material, which reduces costs by reducing weight and improving material yield, and also enables folding the airbag cushion more compactly for storage.

The structure may be a steering wheel of a vehicle; the inflator may be located in a central portion of the steering wheel; and the airbag cushion may be rolled or folded and housed in the central portion.

With the above configuration, a driver airbag is realized, enabling appropriate restraint of the occupant.

Effect of the Invention

The present invention can provide a vehicle airbag device with a simple configuration that can reduce injury values of an occupant.

BRIEF DESCRIPTION OF THE DRAWINGS

FIG. 1 is a diagram depicting the outline of a vehicle airbag device according to an embodiment of the present invention.

FIG. 2 is a view depicting the airbag cushion in FIG. 1(*b*) from each direction during expansion and deployment.

FIG. 3 is a diagram depicting each panel configuring an airbag cushion in FIG. 2(*a*).

FIG. 4 is a diagram depicting the panels of FIG. 3(*b*) in an unfolded state on a plane.

FIG. 5 is various cross-sectional views of the airbag cushion of FIG. 1(*b*).

FIG. 6 is a diagram depicting an example of sewing the side edges of the subpanel of FIG. 4(*c*).

FIG. 7 is a diagram depicting the airbag cushion of FIG. 6(*a*) as viewed from various directions.

FIG. 8 is a diagram depicting the process of the airbag cushion of FIG. 1(*b*) restraining the driver in an oblique collision.

FIG. 9 is a diagram depicting a first modified example of the airbag cushion of FIG. 7(*a*).

FIG. 10 is a diagram depicting a second modified example of the airbag cushion of FIG. 7(*a*).

FIG. 11 is a diagram depicting a modified example of the subpanels depicted in FIG. 4(*d*).

FIG. 12 is a diagram depicting a first and second modified example of the side panel in FIG. 3(*a*).

FIG. 13 is a diagram depicting a third and fourth modified example of the side panel in FIG. 3(*a*).

DESCRIPTION OF THE PREFERRED EMBODIMENTS

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions, and illustrations of elements not directly related to the present invention are omitted.

FIG. 1 depicts an overview of the vehicle airbag device (hereinafter, airbag device 100) according to the first embodiment of the present invention. FIG. 1(*a*) is a diagram depicting a state of the airbag device 100 before activation. As depicted in FIG. 1(*b*), the vehicle airbag device 100 is implemented as a driver airbag for a driver seat 102 on a front row left side in a left hand drive vehicle.

In the present embodiment, the occupant is assumed to be a driver 166 (see FIG. 8(*a*)) seated in the driver seat 102. When the driver 166 is seated in the driver seat 102 with a normal posture, the direction in which the driver 166 faces is referred to as the forward direction, and the opposite direction is referred to as the back direction, and the front-back direction is used to indicate the axes of coordinates. In addition, when the driver 166 is seated in the driver seat 102 in a regular posture, the right side of the driver 166 is referred to as the right direction, the left side of the driver 166 is referred to as the left direction, and the directions are referred to as the left-right direction when axes on coordinates are depicted. Furthermore, when the driver 166 is seated in a regular posture, the head direction of the driver 166 is referred to as up, the waist direction of the driver 166 is referred to as down, and the directions are referred to as the up-down direction when axes on coordinates are depicted.

In the drawings used in the description of embodiments of the present invention below, as necessary, the front, back, left, right, up, and down directions are indicated by arrows F (Forward), B (Back), L (Left), R (Right), U (up), and D (down), with reference to the driver 166 described above (refer to FIG. 8(*a*)).

In the airbag device 100 depicted in FIG. 1(*a*), the airbag cushion 104 is inflated and deployed between the vehicle cabin structure and the driver seated in the seat in the event of an emergency, protecting the driver from contact with the structure. As described above, in the present embodiment, the airbag device 100 is implemented as a driver airbag, and the airbag cushion 104 restrains the driver 166 (see FIG. 8(*c*)) to protect from contact with the steering wheel 106, from being thrown out through the windshield, or the like.

The airbag cushion 104 is a bag shaped member that can be expanded using gas, that is made compact for stowing by being rolled or folded, and is then stowed together with an inflator 112 (see FIG. 5(*a*)) in a storage part 110 at the center of the steering wheel 106.

The storage part 110 is provided closer to the center side than the rim 108 of the steering wheel 106. The storage part 110 has a groove-like tear line or the like provided on the inside of a resin cover on the surface, and the tear line is designed to tear during inflation and deployment of the airbag cushion 104 (see FIG. 1(*b*)).

FIG. 1(*b*) is a diagram depicting a state of the airbag device 100 after activation. The airbag cushion 104 inflates and deploys toward the driver 166 (see FIG. 8) in the driver's seat 102 by cleaving the cover of the storage part 110 due to the inflation pressure of the gas from the inflator 112 (see FIG. 5(*a*)), and restrains the upper body and head of the driver 166 from moving forward.

The airbag cushion 104 is a round shape from the perspective of the driver seat, and expands and deploys in a shape with a recess part 120 formed at the center. The airbag cushion 104 is formed by sewing or adhering a plurality of panels to form a surface.

FIG. 2 is a view depicting the airbag cushion 104 in FIG. 1(*b*) from each direction during expansion and deployment. FIG. 2(*a*) depicts the airbag cushion 104 of FIG. 1(*b*) viewed from slightly above the exterior of the vehicle.

The airbag cushion 104 inflates and deploys into a shape that approximates a rounded cylinder. The surface of the airbag cushion 104 is roughly divided and formed from a bottom surface 114 on the steering wheel 106 (see FIG. 1(*a*)) side, a restraining surface 116 on the occupant side, and a side surface 118 connecting the bottom surface 114 and the restraining surface 116.

The airbag cushion 104 has a recess part 120 recessed in the center of the restraining surface 116 as a characteristic site. The recess part 120 is used to suppress rotation of a head 168 of the driver 166 when restraining an occupant, as depicted in FIG. 8 below.

The recess part 120 is formed by a tether 122 provided inside the airbag cushion 104 pulling a panel forming the restraining surface 116 of the airbag cushion 104 toward the bottom surface 114.

FIG. 2(*b*) is a figure exposing and depicting the tethers 122 from FIG. 2(*a*). The tethers 122 are belt-shaped components, and there are 3 provided in total (1st tether 122*a*, 2nd tether 122*b*, and 3rd tether 122*c*). A first end of the tether 122 is connected to the center panel 130 on the restraining surface side inside the airbag cushion 104, and a second end is connected to a prescribed location on the bottom surface 114 side inside the airbag cushion 104.

FIG. 3 is a diagram depicting each panel configuring an airbag cushion 104 in FIG. 2(*a*). FIG. 3(*a*) is an exploded view of the panels of the airbag cushion 104 of FIG. 2(*a*).

The bottom surface 114 of the airbag cushion 104 is formed by a bottom surface side panel 124. The inner panel 126 is provided over the bottom surface side panel 124 inside the airbag cushion 104 and is connected to the tether 122.

A composite panel 128 is a panel in which the tether 122 and the center panel 130 are integrated together. The center panel 130 is a portion that is provided at the center of the restraining surface 116 (see FIG. 2(*a*)), and forms the middle bottom of the recess part 120. The tether 122 extends from the center panel 130 in a trifurcated manner and is joined to the inner panel 126.

The side panel 132 is a panel that forms a region extending from the side surface 118 to the inner wall of the recess part 120 of the restraining surface 116, and is joined to the bottom surface side panel 124 and the center panel 130.

FIG. 3(*b*) is a diagram depicting the panels of FIG. 3(*a*) in an unfolded state. Of these, the side panel 132 is formed by a plurality of subpanels 132*a* to 132*c* divided in the circumferential direction of the side surface 118. In the present embodiment, the side panel 132 is formed by combining three subpanels 132*a* to 132*c*. Each of the subpanels 132*a* to 132*c* has the same polygonal configuration.

FIG. 4 is a diagram depicting the panels of FIG. 3(*b*) in an unfolded state on a plane. FIG. 4(*a*) is a diagram depicting the bottom surface side panel 124 of FIG. 3(*b*).

The bottom surface side panel 124 is circular and forms a reaction surface that captures reaction forces from the steering wheel 106 (see FIG. 1(*a*)) during inflation and deployment of the airbag cushion 104. A securing region 156 is formed in the center of the bottom surface side panel 124 as a region where the inflator 112 (see FIG. 5) is inserted and secured to the storage part 110 (see FIG. 1(*a*)). In addition, vent holes 157*a* and 157*b* are provided as sites for discharging gas to the outside.

FIG. 4(*b*) is a diagram depicting the inner panel 126 of FIG. 3(*b*). The inner panel 126 is overlapped with the securing region 156 of the bottom surface side panel 124, and a securing region 158 is formed as a portion into which the inflator 112 (see FIG. 5(*a*)) is inserted. In addition, three protruding parts 160*a* to 160*c* are formed as sites where the three tethers 122*a* to 122*c* are joined.

FIG. 4(*c*) is a diagram depicting the composite panel 128 of FIG. 3(*b*). The composite panel 128 has a trifurcated shape with three band-like tethers 122*a* to 122*c* extending from a circular center panel 130. The center panel 130 is circular and forms the inner bottom of the recess part 120 (see FIG. 2(*a*)). The tethers 122*a* to 122*c* extend radially from the edge of the circular center panel 130 and are joined by sewing or the like to protruding parts 160*a* to 160*c* of the inner panel 126, respectively. In the present embodiment, the tethers 122*a* to 122*c* have the same length, but the dimensions of the tethers 122*a* to 122*c* do not need to be strictly equal, and some dimensional difference is permissible.

Note that the shape of the center panel 130 is not limited to a circle, but may be a polygon, or the like. In addition, the tethers 122*a* to 122*c* are not limited to being formed integrally with the center panel 130, but may be formed as separate members and then connected to the center panel 130. Either configuration allows the center panel 130 to be pulled in the direction of the bottom surface side panel 124.

FIG. 4(*d*) is a diagram depicting the subpanel 132*a* of FIG. 3(*b*). The subpanels 132*a* to 132*c* have a polygonal shape. A pair of left and right side edges 134, 135 of the subpanel 132*a* are joined to adjacent subpanels 132*b*, 132*c* (see FIG. 3(*b*)) by sewing or the like.

The first edge 136 is the edge on the side of the restraining surface 116 (see FIG. 2(*a*)), and is joined to the edge of the circular inner panel 126 (FIG. 4(*c*)) by sewing or the like. The second edge 138 is the edge on the bottom surface 114 (see FIG. 2(*a*)) side, and is joined to the edge of the circular bottom surface side panel 124 (see FIG. 4(*a*)) by sewing or the like. The first edge 136 and the second edge 138 are slightly curved to conform to the shape of the center panel 130 and the bottom surface side panel 124.

The subpanel 132*a* protrudes at an angle from an intermediate position on the side edges 134, 135, and is widest at a location slightly toward the second edge 138 side than the center between the first edge 136 and the second edge 138 (intermediate portion 140). At this time, the dimension from the first edge to the second edge 138 of the subpanel 132 a is set to be longer than the dimension of the intermediate portion 140.

A tapered region 142 from the intermediate portion 140 to the first edge 136 gradually narrows toward the first edge 136. When the airbag cushion 104 is inflated and deployed, a tapered region 142 including the first edge 136 is pulled to the bottom surface side panel 124 (see FIG. 3(*a*)) side by the tether 122, forming a recess part 120.

In the present embodiment, the subpanel 132*a* is formed with the first edge 136 shorter than the second edge 138. With these configurations, when the side edges 134, 135 of the subpanel 132*a* are joined together to form the side panel 132, as depicted in FIG. 3(*a*), the side panel 132 has a narrowed shape on the restraining surface 116 side. The side panel 132 allows the recess part 120 to be efficiently formed on the restraining surface 116.

Furthermore, with this side panel 132, the subpanels 132*a* to 132*c* having the aforementioned configuration enable forming the recess part 120 while simplifying the configuration, thereby reducing the amount of material used, reducing costs by reducing weight and improving material yield, and also enabling the airbag cushion 104 to be folded more compactly for storage.

FIG. 5 is various cross-sectional views of the airbag cushion 104 of FIG. 1(*b*). FIG. 5(*a*) is a cross-sectional view along A-A of the airbag cushion 104 of FIG. 1(*b*). The internal configuration of the airbag cushion 104 is described below.

Inside the airbag cushion 104, a tether 122 is stretched between the recess part 120 and the bottom surface 114 side. The airbag cushion 104 can efficiently form and maintain the recess part 120 in a recessed state by pulling the recess part 120 toward the inflator 112 by the tether 122.

The inflator 112 is a gas generating device that is secured to the bottom of the storage part 110 (see FIG. 1(*a*)). A portion thereof having a gas outlet penetrates the bottom surface side panel 124 and is inserted into the airbag cushion 104.

Upon receiving a detection signal sent from a sensor (not depicted), the inflator 112 is activated, and thereby supplies gas to the airbag cushion 104. The inflator 112 is disk-shaped and has a cylindrical main body 144 having an ejection port, and a flange 146 provided on the outer periphery of the main body 144.

The inflator 112 is provided with a plurality of stud bolts 148. The stud bolts 148 pass through the bottom surface side panel 124 of the airbag cushion 104 and are fastened to the bottom of the storage part 110 (see FIG. 1(*a*)). The airbag cushion 104 is also secured to the storage part 110 by fastening the stud bolts 148.

Note that examples of currently prevailing inflators include: types which are filled with a gas generating agent and burn the agent to generate gas; types which are filled with compressed gas and supply gas without generating heat; hybrid types which utilize both combustion gas and compressed gas; and the like. Any of these types can be used for the inflator 112.

Each tether, such as tether 122*c*, is routed between the center panel 130 and the inner panel 126 around the periphery of the inflator 112. A dimension L1 from a base 150 of the tether 122*c* on the center panel 130 side to a base 162 of the protruding part 160*c* of the inner panel 126 is formed to be a dimension that creates tension between the center panel 130 and the inner panel 126, in other words, between the center panel 130 and the inflator 112, when the airbag cushion 104 is inflated and deployed, allowing the center panel 130 to be pulled toward the inflator 112. The recess part 120 recessed toward the bottom surface 114 in the restraining surface 116 can be efficiently formed and maintained by using the tether 122 having this configuration.

Note that, in another embodiment, the tip of the tether 122 can be appropriately connected to the inflator 112, a retainer (not depicted) used to secure the inflator 112, as well as the bottom or the like of the storage part 110 (see FIG. 1(*a*)), and the bottom surface 114 side of the airbag cushion 104.

FIG. 5(*b*) is a schematic diagram depicting only the panel of the airbag cushion 104 of FIG. 5(*a*). When the side panel 132 is formed by combining subpanels 132*a* having the shape depicted in FIG. 4(*d*), the side panel 132 is not simply cylindrical, but has a shape that gradually widens towards the driver side. At this time, the airbag cushion 104 in FIG. 5(*b*) also has a maximum diameter part 164 where the diameter is a maximum, formed by the intermediate portion 140 in FIG. 4(*d*).

The position of the maximum diameter part 164 can be adjusted by changing the position of the intermediate portion 140 of the subpanel 132*a* (see FIG. 4(*d*)) between the first edge 136 and the second edge 138. The portion of the side panel 132 from the maximum diameter part 164 to the center panel 130 of the recess part 120 has a small radius of curvature and tends to have low tension, enabling more softly restraining the driver 166 (see FIG. 8(*c*)).

FIG. 6 is a diagram depicting sewing (sewn parts 200, 202) of the side edges 134, 135 of the subpanel 132*a* of FIG. 4(*c*). FIG. 6(*a*) depicts an example of the airbag cushion 104 and the driver 166 as viewed from above. Presumably, the driver 166 is seated in the driver seat 102 (see FIG. 1(*a*)) with a normal posture.

The imaginary line V1 is an imaginary straight line connecting the geometric center P1 of the inflator 112 and the center P2 of the head 168 of the normally seated driver 166 when the airbag cushion 104 is inflated and deployed. The center P1 of the inflator 112 may be the geometric center or the center of gravity of the inflator 112. Furthermore, the center P2 of the head 168 can also be the geometric center or the center of gravity of the head 168. Furthermore, the side edges 134, 135 of the subpanel 132*a* of the airbag cushion 104 are joined to the side edges of the adjacent subpanels 132*b*, 132*c* by sewn parts 200, 202 that are sewn so as to extend in the direction along the imaginary line V1.

The aforementioned "direction along the imaginary line V1" is intended to include not only a configuration parallel to the imaginary line V1, but also a configuration that can be said to extend in substantially the same direction as the imaginary line V1. For example, if an orthogonal line perpendicular to imaginary line V1 is at an angle of +90° with respect to the imaginary line V1, a range of 0° to +45° with respect to the imaginary line V1 can be defined as the "direction along the imaginary line V1".

FIG. 6(*b*) is a diagram depicting the airbag cushion 104 and the driver 166 in FIG. 6(*a*) as viewed from the left side in the vehicle width direction. In FIG. 6(*b*) as well, the sewn part 200 is formed so as to extend in a direction along the imaginary line V1, in other words, within a range of 0° to +45° with respect to the imaginary line V1.

FIG. 7 is a diagram depicting the airbag cushion 104 of FIG. 6(*a*) as viewed from various directions. FIG. 7(*a*) is a diagram depicting the airbag cushion 104 of FIG. 6(*a*) as viewed from the occupant side. When the airbag cushion 104 of the present embodiment is inflated and deployed, five folds 204*a* to 204*e* are formed on the inner wall of the recess part 120 so as to extend along the imaginary line V1 (see FIG. 6(*b*)), and five restraining parts 206*a* to 206*e* are formed by these folds 204*a* to 204*e*.

The restraining parts 206*a* to 206*e* are formed radially from the center of the recess part 120 by dividing the inner wall of the recess part 120 in the inner circumferential direction by a plurality of folds 204*a* to 204*e* when inflated and deployed. The restraining parts 206*a* to 206*e* function as sites for softly restraining the head 168 of the driver 166 (see FIG. 8(*c*)).

The folds 204*a* to 204*e* and the restraining parts 206*a* to 206*e* are formed by the action of the tether 122 (see FIG. 5(*a*) and the like) pulling the recess part 120 to the inside of the airbag cushion 104. More specifically, the region from the side surface 118 of the airbag cushion 104 to the restraining surface 116 including the recess part 120 is formed by providing a plurality of subpanels 132*a* to 132*c* (see FIG. 6(*a*), or the like) in a continuous and seamless manner. Furthermore, the recess part 120 is formed by pulling the first edge 136 side of the subpanel 132*a* (see FIG. 4(*d*)) largely toward the inside of the airbag cushion 104 by the tether 122.

As described above, when the sewn parts 200, 202 (see FIG. 6(*a*)) of the side edges 134, 135 of the subpanel 132*a* are formed along the imaginary line V1 connecting the inflator 112 and the head 168 of the driver 166, a force that causes the airbag cushion 104 to expand in the circumferential direction as seen by the driver 166 is applied to the sewn parts 200, 202 in a perpendicular direction. Furthermore, the plurality of sewn parts such as sewn parts 200, 202 absorb this force, thereby suppressing the tendency of the airbag cushion 104 to expand radially around the imaginary line V1, and thus the airbag cushion 104 maintains softness in the direction along the imaginary line V1.

In addition, the recess part 120 is in a state where the first edge 136 (see FIG. 4(*d*)) of the subpanels 132*a* to 132*c* is folded back toward the inside of the airbag cushion 104 (see FIG. 3(*a*)), and the portions of the subpanels 132*a* to 132*c* that form the restraining surface 116 including the recess part 120 are loose, so this portion has relatively weak tension and is in a relaxed state without tension. These actions, together with the force of the tether 122 pulling the recess part 120, cause the folds to form on the inner wall of the recess part 120 (see FIG. 7(*a*)). Furthermore, the portions of the inner wall of the recess part 120 between the folds 204*a* to 204*e* protrude toward the center of the recess part 120, thereby forming restraining parts 206*a* to 206*e*.

FIG. 7(*b*) is a cross-sectional view of the airbag cushion 104 in FIG. 6(*a*) along line B-B. The cross-section B-B is a cross-section perpendicular to the imaginary line V1. The formation of the folds 204*a* to 204*e* (see FIG. 7(*a*)) can be adjusted by the position of the tethers 122*a* to 122*c*.

As depicted in FIG. 7(*b*), in the present embodiment, three tethers 122*a* to 122*c* are provided. These tethers 122*a* to 122*c* are provided at three locations around the periphery of the inflator 112, dividing the periphery of the inflator 112 into three equal parts.

In the present embodiment, the tethers 122*a* to 122*c* are configured such that, when a cross-section of the airbag cushion 104 perpendicular to the imaginary line V1 is viewed as a clock, the tether 122*a* is positioned near the 12 o'clock position, and the other tethers 122*b* and 122*c* are positioned between 3 o'clock and 9 o'clock.

In detail, when the inflated and deployed airbag cushion 104 is viewed from the occupant side, a clock face is placed with a prescribed point as the axis of rotation, and the top of the airbag cushion 104 is considered to be in the 12 o'clock direction and the bottom is considered to be in the 6 o'clock direction. On the face of this clock, each hour is positioned by dividing into 12 equal parts. For example, 4 o'clock is 120° clockwise from 12 o'clock, and 8 o'clock is 240° clockwise from 12 o'clock. In the present embodiment, the center P1 of the inflator is set as the center point of the clock, but the center of the shape of the airbag cushion 104 can be set as the center point of the clock.

In the present embodiment, of the three tethers 122*a* to 122*c*, tether 122*a* is located near the 12 o'clock position, tether 122*b* is located near the 4:30 position, and tether 122*c* is located near the 7:30 position. Of these, the 4:30 position is the position 45 degrees rotated from the 3 o'clock position when the lower half of the clock face is divided into four equal parts at 45 degrees each. Furthermore, 90 degrees from this position is the 7:30 position. The folds 204*a* to 204*e* and restraining part 206*a* to 206*e* described above can be efficiently formed by pulling the recess part 120 (FIG. 7(*a*)) by tethers 122*a* to 122*c* provided in this configuration, Note that the aforementioned positions of the tethers 122*a* to 122*c* are merely examples, and the positions are not necessarily positioned strictly at the 12 o'clock position, 4:30 position, and 7:30 position, but may be positioned at other positions. Furthermore, the center of rotation of the clock face does not need to coincide with the center P1 of the inflator. For example, first, one tether can be placed, and then the other tethers are placed at the hour positions based on the position of the first tether being at the 12 o'clock position on the clock.

FIG. 7(*c*) is a cross-sectional view of the airbag cushion 104 in FIG. 7(*a*) along line C-C. The recess part 120 is configured to include an inlet 208 on the occupant side, a middle bottom part 210 on the bottom surface 114 side, and an intermediate part 212 formed at a prescribed location between the inlet 208 and the middle bottom part 210.

Regarding the recess part 120, the space E3 inside the intermediate part 212 is narrower than the spaces E1, E2 inside the inlet 208 and the middle bottom part 210, respectively (E1, E2>E3), in a direction perpendicular to the imaginary line V1 of the airbag cushion, or in other words, in a cross-section perpendicular to the imaginary line V1. In other words, the recess part 120 is configured such that the intermediate part 212 protrudes toward the imaginary line V1. The intermediate part 212 with this configuration has a small radius curvature and low tension, so the driver 166 (see FIG. 8(*c*)) can be restrained with less burden.

FIG. 8 is a diagram depicting the process of the airbag cushion 104 of FIG. 1(*b*) restraining the driver 166 in an oblique collision. Each of the diagrams in FIG. 8 correspond to the A-A cross-sectional view of the airbag cushion 104 in FIG. 1(*b*), depicting the airbag cushion 104 and the driver 166 as seen from above the vehicle.

FIG. 8(*a*) is a diagram depicting the appearance of the airbag cushion 104 immediately after expansion and deployment. As depicted in FIG. 8(*a*), when the vehicle is in an oblique collision, the airbag cushion 104 expands and deploys to the front of the driver seat 102 in the vehicle (see FIG. 1(*b*)).

FIG. 8(*b*) depicts a state of the driver 166 of FIG. 8(*a*) moving towards the front of the vehicle. There are cases where the driver 166 moves diagonally to the left in the vehicle width direction from the state of FIG. 8(*a*) due to inertia during an oblique collision.

FIG. 8(*c*) depicts a state of the driver 166 of FIG. 8(*b*) moving further towards the front of the vehicle. A driver 166 moving diagonally forward may bring, for example, the left shoulder into contact with the portion of the restraining surface 116 surrounding the recess part 120, and the left side of the head 168 will contact the inner wall of the recess part 120.

A restraining surface 116 that forms the recess part 120 can restrain the head 168 from the diagonal front by the inner wall of the recess part 120 while reducing tension around the recess part 120, as compared to a conventional restraining surface that extends in a planar shape. In particular, restraining parts 206*a* to 206*e* (see FIG. 7(*a*)) with reduced tension are formed on the inner wall of the recess part 120, so the recess part 120 is able to more softly restrain and protect the head 168.

In this manner, the airbag cushion 104 can minimize the rotation 172 of the head 168 of the driver 166 relative to the shoulder 170 by using the recess part 120 without dislodging the driver 166, who moves diagonally in an oblique collision, and can restrain the movement of the head 168 and the movement of the shoulders 172 in a coordinated manner.

In particular, in the present embodiment, the tether 122 pulls the restraining surface 116, enabling efficient formation of the recess part 120 that is recessed in the center of the restraining surface 116. The airbag cushion 104 not only serves to restrain the occupant during a normal collision, but also significantly reduces or eliminates the rotation 172 of the head 168 of the driver 166 during an oblique collision, thereby reducing the angular velocity of the head 168 and thus suppressing the injury level of the driver 166 associated with the rotation 172 of the head 168.

As described with reference to FIG. 7(*a*), in the present embodiment, the plurality of subpanels 132*a* to 132*c* constituting the side surface 118 and the recess part 120 of the airbag cushion 104 are joined by sewn parts 200, 202 along the imaginary line V1 connecting the inflator 112 and the head 168 of the driver 166. The sewn parts 200, 202 along the imaginary line V1 are subjected to a force acting perpendicularly to the airbag cushion 104 that is expanding in the circumferential direction, as seen by the driver 166, and are therefore able to absorb this force. As a result, the subpanels 132*a* to 132*c* have reduced tension, and are pulled to the inside of the airbag cushion 104 by the tether 122, so folds 204*a* to 204*e* and restraining parts 206*a* to 206*e* are formed on the inner wall of the recess part 120. The driver 166 can be restrained more softly by the restraining parts 206*a* to 206*e*, so the injury level of the driver 166 can be further reduced.

Furthermore, in the present embodiment, the recess part 120 is formed with a simple structure using the tether 122 and the side panel 132 made by a combination of a plurality of subpanels 132*a* to 132*c*. Therefore, with the present embodiment, the amount of materials used for the panels and the like is low enabling weight reduction and increase in material yield, thereby achieving low cost, and further the airbag cushion 104 can also be folded and stowed in a more compact manner.

Note that with the description with reference to FIG. 8(*c*) described above, clockwise rotation was used as an example of rotation 172 that occurs with the head 168. However, depending on the conditions of the emergency, the driver 166 may move obliquely to the right in the vehicle width direction and the head 168 may rotate counterclockwise centered on the neck as viewed from above. The airbag cushion 104 of the present embodiment is able to reduce or eliminate rotation of the head 168 using the recess part 120 for this counterclockwise rotation as well and is able to reduce angular velocity of the head 168. In this manner, the airbag cushion 104 of the present embodiment is able to achieve the same effect regardless of which direction in the vehicle width direction the driver 166 moves towards.

Modified Example

FIG. 9 is a diagram depicting a first modified example of the airbag cushion 104 in FIG. 7(*a*) (airbag cushion 220). In FIG. 9, the same codes are attached to the same structural elements as described above, and a description of the aforementioned structural elements is omitted. In the following description, components having the same name as a component already described are assumed to have the same function unless otherwise specified, even if marked with a different sign.

FIG. 9(*a*) is a diagram depicting the airbag cushion 220 corresponding to FIG. 7(*a*) as viewed from the occupant side. The airbag cushion 220 has a different configuration from the airbag cushion 104 of FIG. 7(*a*) by having six folds 222*a* to 222*f* and six restraining parts 224*a* to 224*f*.

FIG. 9(*b*) is a diagram depicting a composite panel 226 included in the airbag cushion 220 of FIG. 9(*a*). The composite panel 226 differs from the configuration of the composite panel 128 of FIG. 4(*c*) in that the dimension of the tether 228 positioned at the 12 o'clock position (see FIG. 7(*b*)) is shorter than the other tethers 122*b*, 122*c*.

FIG. 9(*c*) is a diagram depicting an example of the internal configuration of the airbag cushion 220 of FIG. 9(*a*). With the airbag cushion 220, the length of the tether 228 at the 12 o'clock position between the bottom surface 114 and the center panel 130 forming the middle bottom of the recess part 120 (see FIG. 9(*a*)) is shorter than the length of the other tethers 122*b*, 122*c*. Therefore, the upper side of the recess part 120 is configured to be greatly pulled by the tether 228.

Even with a configuration having tether 228, folds 222*a* to 222*f* and restraining parts 224*a* to 224*f* can be efficiently formed by pulling the recess part 120. In particular, the airbag cushion 220 can form six restraining parts 224*a* to 224*f*, which is more than the five restraining parts 206*a* to 206*e* of the airbag cushion 104 in FIG. 7(*a*), due to the short dimension of the tether 228. In this manner, by changing the dimension of the tether 228, the number of restraining parts 224*a* to 224*f* can be changed, and the tension on the inner wall of the recess part 120 can be adjusted.

FIG. 10 is a diagram depicting a second modified example of the airbag cushion 104 in FIG. 7(*a*) (airbag cushion 240). FIG. 10(*a*) is a diagram depicting the airbag cushion 240 corresponding to FIG. 7(*a*) as viewed from the occupant side. The airbag cushion 240 has a different configuration from the airbag cushion 104 of FIG. 7(*a*) by having four folds 242*a* to 242*d* and four restraining parts 244*a* to 244*d*.

FIG. 10(*b*) is a diagram depicting a composite panel 246 included in the airbag cushion 240 of FIG. 10(*a*). The composite panel 246 differs in configuration from the composite panel 128 of FIG. 4(*c*) in that tethers 248*a*, 248*b* are provided near the 3 o'clock position (see FIG. 7(*b*)) and near the 9 o'clock position.

FIG. 10(*c*) is a diagram depicting an inner panel 250 provided on the airbag cushion 240 of FIG. 10(*a*). The inner panel 250 differs in configuration from the inner panel 126 of FIG. 4(*b*) in that two protruding parts 252*a*, 252*b* are provided, corresponding to the composite panel 246.

FIG. 10(*d*) is a diagram depicting an example of the internal configuration of the airbag cushion 240 of FIG. 10(*a*). In the airbag cushion 240, the tethers 248*a*, 248*b* are provided at positions facing each other on the left and right sides around the inflator 112 (see FIG. 7(*b*)). As described above, these positions are near the 3 o'clock position and near the 9 o'clock position in FIG. 7(*b*), for example, positions on both the left and right sides of the center P1 of the inflator 112 as the center.

The aforementioned tethers 248*a*, 248*b* can also be used to efficiently form the folds 242*a* to 242*d* and the restraining parts 244*a* to 244*d* by pulling the recess part 120 (see FIG. 10(*a*)). In particular, the airbag cushion 240 has a smaller number of tethers 248*a*, 248*b*, and thus can form four restraining parts 244*a* to 244*d*, which is fewer than the five restraining parts 206*a* to 206*e* of the airbag cushion 104 in FIG. 7(*a*). In this manner, the number of restraining parts 244*a* to 244*d* can be changed and the tension of the inner wall of the recess part 120 can be adjusted by changing the number of tethers 248*a*, 248*b*.

As an alternative to the tethers 248*a*, 248*b* in FIG. 10(*d*), two tethers may be placed near the 12 o'clock position (see FIG. 7(*b*)) and near the 6 o'clock position. With a tether of this configuration as well, folds and restraining parts similar to folds 242*a* to 242*d* and restraining parts 244*a* to 244*d* can be efficiently formed by pulling the recess part 120 (see FIG. 7(*a*)).

Note that the above embodiments had two or three tethers. However, four or more tethers may be provided as another modified example. By increasing or decreasing the number and length of the tethers, the number of folds and restraining parts can be adjusted, thereby changing the tension on the inner wall of the recess part.

FIG. 11 is a diagram depicting a modified example of the subpanels 132*a* depicted in FIG. 4(*d*). FIG. 11(*a*) is a diagram depicting a subpanel 180 of the first modified example.

The subpanel 180 is widest at the second edge 182. With this configuration, an airbag cushion 104 can be achieved with a maximum diameter part 164 (see FIG. 5(*b*)) on the bottom surface 114 side, and can be inflated and deployed with a more stable posture. Furthermore, with this configuration, a side panel 132 (see FIG. 3(*a*)) having a narrower shape on the side of the restraining surface 116 can be suitably formed by connecting the side edges of a plurality of subpanels 180 together.

FIG. 11(*b*) is a diagram depicting a subpanel 190 of the second modified example. The subpanel 190 has curved side edges 192, 194.

The subpanel 190 has a curved configuration in which a pair of left and right side edges 192, 194 protrude in directions away from each other. Furthermore, a side panel 132 (see FIG. 3(*a*)) that can be inflated into a gentle curved shape can be achieved by combining a plurality of subpanels 190. Furthermore, a side panel 132 (see FIG. 3(*a*)) having a narrower shape on the side of the restraining surface 116 can be suitably formed by connecting the side edges of the subpanels 190 together.

In each of the above examples, the subpanels to be combined do not have to have the same shape, and may have a configuration divided into three or more parts. In either configuration, a side panel 132 (see FIG. 3(*a*)) that is narrower on the occupant side can be achieved by joining the side edges of the subpanels.

In the above examples, the technical concept of the airbag device 100 is embodied as a driver airbag. However, the airbag device 100 can also be embodied as, for example, a knee airbag. Even when the airbag device 100 is configured as a knee airbag, the knees of the occupant can be appropriately restrained from the front by the recess part using the tether, and can be protected from contact with the instrument panel, or the like. In addition, the airbag device 100 can also be used to restrain a rear seat occupant, for example by restraining the rear seat occupant from the front, thereby protecting the occupant from coming into contact with the front seat or from being thrown forward.

FIG. 12 is a diagram depicting a first and second modified example of the side panel 132 in FIG. 3(*a*). FIG. 12(*a*) is a diagram depicting a side panel 260 of the first modified example.

The side panel 260 is formed by joining together side edges 262*a*, 262*b*, 264*a*, 264*b* of two trapezoidal subpanels 262, 264. Using the subpanel 262 as an example, the subpanel 262 is sewn to the edge of the bottom surface side panel 124 (see FIG. 4(*a*)) on the short edge 262*d* corresponding to an upper base of the trapezoid, and is sewn to the edge of the occupant-side panel (see FIG. 12(*b*)) on the long edge 262*c* corresponding to a lower base of the trapezoid in order to form a side surface of the airbag cushion.

The subpanel 262 has a long edge 262*c* on the occupant side that is wider than the short edge 262*d* on the steering wheel side. Therefore, the airbag cushion formed by using the subpanel 262 on the side surface gradually becomes larger toward the driver 166 (see FIG. 6(*b*)), and folds 204*a* to 204*e* (see FIG. 7(*a*)) and restraining parts 206*a* to 206*e* are more likely to form when pulled by the tether 122 (see FIG. 5(*a*)) because there is extra space in the panel on the occupant side.

FIG. 12(*b*) is a diagram depicting an occupant-side panel 266 that is combined with the subpanels 262, 264 of FIG. 12(*a*). The occupant-side panel 266 is circular and forms the restraining surface 116 that restrains the driver 166 (see FIG. 6(*b*)) when the airbag cushion is inflated and deployed. A sewn part 268 is formed in the center of the occupant-side panel 266, and the center panel 130 of the composite panel 128 (see FIG. 4(*c*)) is joined to the inside.

In the present embodiment, a recess part 120 (see FIG. 5(*a*)) can be formed in the center portion of the occupant-side panel 266 by joining the center panel 130 (see FIG. 4(*c*)) to the inside of the occupant-side panel 266 and pulling the center portion of the occupant-side panel 266 toward the bottom surface side panel 124 (see FIG. 4(*a*)) using the tether 122.

Even with an airbag cushion using the side panel 260 and occupant-side panel 266, folds 204*a* to 204*e* and restraining parts 206*a* to 206*e* can be formed on the inner wall of the recess part 120 (see FIG. 7(*a*)) formed by the occupant-side panel 266 during inflation and deployment, so as to extend along the imaginary line V1 (see FIG. 6(*b*)). Therefore, this modified example also enables softly restraining the driver 166, and further reduces the injury level of the driver 166.

In addition, the side panel 260 and the occupant-side panel 266 also enable formation of the recess part 120 while simplifying the configuration of the airbag cushion, thereby reducing the amount of material used, and thus reducing costs by reducing weight and improving material yield, and even enabling the airbag cushion to be folded up more compactly for storage.

FIG. 12(*c*) is a diagram depicting a side panel 270 according to a second modified example. The side panel 270 is a combination of four circular fan shaped subpanels 272.

The side panel 270 has an arcuate strip shape in a state unfolded on a plane. The side panel 270 has a large diameter arc 274 sewn to the edge of the occupant-side panel 266 (see FIG. 12(*b*)) and a small diameter arc 276 sewn to the edge of the bottom surface side panel 124 (see FIG. 4(*a*)), forming the side surface of the airbag cushion.

The subpanel 272 is formed in an annular fan shape having a large arc on the occupant-side panel 266 side, and the side edges 272*a*, 272*b* are joined to the side edges of the adjacent subpanels to form the side panel 270. The airbag cushion formed by using subpanel 272 on the side surface, similar to the airbag cushion using subpanels 262, 264 (see FIG. 12(*a*)), gradually becomes larger toward the driver 166 (see FIG. 6(*b*)), which creates space in the panel on the occupant side, facilitating folds 204*a* to 204*e* (see FIG. 7(*a*)) and restraining parts 206*a* to 206*e* to form when pulled by tether 122 (see FIG. 5(*a*)).

Even with an airbag cushion using the side panel 270 and occupant-side panel 266, folds 204*a* to 204*e* and restraining parts 206*a* to 206*e* can be formed on the inner wall of the recess part 120 (see FIG. 7(*a*)) formed by the occupant-side panel 266 during inflation and deployment, so as to extend along the imaginary line V1 (see FIG. 6(*b*)). Therefore, this modified example also enables softly restraining the driver 166, and further reduces the injury level of the driver 166.

In addition, the side panel 270 and the occupant-side panel 266 also enable formation of the recess part 120 while simplifying the configuration of the airbag cushion, thereby reducing the amount of material used, and thus reducing costs by reducing weight and improving material yield, and even enabling the airbag cushion to be folded up more compactly for storage.

FIG. 13 is a diagram depicting a third and fourth modified example of the side panel 132 in FIG. 3(*a*). FIG. 13(*a*) is a diagram depicting a side panel 280 of the third modified example.

The side panel 280 has a flower-like shape when spread flat, and a dome-like shape that forms the occupant-side restraining surface 116 (see FIG. 6(*b*)) and the side surface of the airbag cushion can be formed by connecting the adjacent side edges of each subpanel portion 282*a* to 282*c* together.

Describing the shape of the side panel 280 in more detail, when spread flat, three tapered notches 286*a* to 286*c* are formed from a curved outer periphery 284 toward the center, forming three subpanel portions 282*a* to 282*c*. The side edges of the subpanel portions 282*a* to 282*c*, such as side edge 288 and side edge 290 or the like, may be gently curved to form a dome shape by joining together adjacent side edges.

A sewn part 292 is formed in the center of the side panel 280, and the center panel 130 of the composite panel 128 (see FIG. 4(*c*)) is joined to the inside. The side panel 280 can also have a recess part 120 (see FIG. 5(*a*)) formed in the center portion by joining the center panel 130 (see FIG. 4(*c*)) to the inside of the center portion and pulling the center portion toward the bottom surface side panel 124 (see FIG. 4(*a*)) using the tether 122.

Even with an airbag cushion using the side panel 280, folds 204*a* to 204*e* and restraining parts 206*a* to 206*e* can be formed on the inner wall of the recess part 120 (see FIG. 7(*a*)) so as to extend along the imaginary line V1 (see FIG. 6(*b*)) when inflated and deployed. Therefore, this modified example also enables softly restraining the driver 166, and further reduces the injury level of the driver 166.

FIG. 13(*b*) is a diagram depicting a side panel 300 of the fourth modified example. When the side panel 300 is spread flat, four tapered notches 306*a* to 306*d* are formed from a curved outer periphery 304 toward the center, forming four subpanel portions 302*a* to 302*d*.

The side panel 300 can also be formed into a dome-like shape that forms the occupant-side restraining surface 116 (see FIG. 6(*b*)) and the side surface of the airbag cushion by connecting adjacent sides of each subpanel portion 302*a* to 302*d*, such as side edge 310 and side edge 312.

The side panel 300 can also have a recess part 120 (see FIG. 5(*a*)) formed in the center portion by providing sewn parts 308 that join the center panel 130 (see FIG. 4(*c*)) to the inside of the center portion and pulling the center portion toward the bottom surface side panel 124 (see FIG. 4(*a*)) using the tether 122.

Even with an airbag cushion using the side panel 300, folds 204*a* to 204*e* and restraining parts 206*a* to 206*e* can be formed on the inner wall of the recess part 120 (see FIG. 7(*a*)) so as to extend along the imaginary line V1 (see FIG. 6(*b*)) when inflated and deployed. Therefore, this modified example also enables softly restraining the driver 166, and further reduces the injury level of the driver 166.

Preferred embodiments of the present invention were described with reference to the appended drawings, but it goes without saying that the present invention is not limited to such examples. It is clear that a person of ordinary skill in the art could conceive of various modifications or revisions within the scope set forth by the claims, and it would be understood that these modifications or revisions would belong to the technical scope of the present invention.

Moreover, the example in which the airbag device according to the present invention is applied to an automobile has been described in the embodiments described above. However, in addition to automobiles, the present invention can be applied to aircrafts, ships, and the like, with the same operation and effects capable of being achieved.

INDUSTRIAL APPLICABILITY

The present invention can be used as a vehicle airbag device for restraining an occupant during an emergency.

EXPLANATION OF CODES

100. Airbag device, 102. Driver seat, 104. Airbag cushion, 106. Steering wheel, 108. Rim, 110. Storage part, 112. Inflator, 114. Bottom surface, 116. Restraining surface, 118. Side surface, 120. Recess part, 122. Tether, 122*a*. First tether, 122*b*. Second tether, 122*c*. Third tether, 124. Bottom surface side panel, 126. Inner panel, 128. Composite panel, 130. Center panel, 132. Side panel, 132*a*-132*c*. Subpanel, 134, 135. Side edge, 136. First edge, 138. Second edge, 140. Intermediate portion, 142. Tapered region, 144. Main body, 146. Flange, 148. Stud bolt, 150. Base, 156. Securing region, 157*a*, 157*b*. Vent hole, 158. Securing region, 160*a*. Protruding part, 162. Base, 164. Maximum diameter part, 166. Driver, 168. Head, 170. Shoulder, 172. Rotation, 180. Subpanel, 182. Second edge, 190. Subpanel, 192, 194. Side edge, E1-E3. Space, L1. Dimension, P1. Center of inflator, P2. Center of head, V1. Imaginary line, 200, 202. Sewn part, 204*a* to 204*e*. Folds, 206*a* to 206*e*. Restraining part, 208. Inlet, 210. Middle bottom part, 212. Intermediate part, 220. Airbag cushion, 222*a* to 222*f*. Folds, 224*a* to 224*f*. Restraining part, 226. Composite panel, 228. Tether, 240. Airbag cushion, 242*a* to 242*d*. Folds, 244*a* to 244*d*. Restraining part, 246. Composite panel, 248*a*, 248*b*. Tether, 250. Inner panel, 252*a*, 252*b*. Protruding part, 260. Side panel, 262, 264. Subpanel, 262*a*, 262*b*. Side edge, 262*c*. Long edge, 262*d*. Short edge, 266. Occupant side panel, 268. Sewn part, 270. Side panel, 272. Subpanel, 272*a*, 272*b*. Side edge, 274. Arc, 276. Arc, 280. Side panel, 282*a* to 282*c*. Subpanel portion, 284. Outer periphery, 286*a* to 286*c*. Notch, 288, 290. Side edge, 292. Sewn part, 300. Side panel, 302*a* to 302*d*. Subpanel portions, 304. Outer circumference, 306*a* to 306*d*. Notch, 308. Sewn part, 310, 312. Side edge

The invention claimed is:

1. A vehicle airbag device, containing an airbag cushion that is inflated and deployed between a structure in a vehicle cabin and an occupant seated in a seat in the event of an emergency, and an inflator that is installed on the structure, the airbag cushion comprising:

a bottom surface into which the inflator is inserted;

a restraining surface on an occupant side;

a side surface connecting the bottom surface and the restraining surface;

a recess part formed in a prescribed range at a center of the restraining surface recessed toward the bottom surface, the recess part comprising:

an inlet on the occupant side;

a middle bottom part on a bottom surface side; and an intermediate part formed between the inlet and the middle bottom part, wherein the intermediate part is narrower than the inlet and the middle bottom part; and one or more tethers extending between the recess part and the bottom surface;

wherein the recess part is pulled toward the bottom surface by the tether during the inflation and deployment, the airbag cushion further comprising:

a plurality of folds formed on an inner wall of the recess part during inflation and deployment; and a plurality of restraining parts formed radially so as to divide the inner wall in an inner circumferential direction by the plurality of folds during inflation and deployment.

2. The vehicle airbag device according to claim 1, wherein the one or more tethers are a plurality of tethers; and the plurality of tethers are provided at three locations around the inflator.

3. The vehicle airbag device according to claim 2, wherein, when the inflator is viewed as a clock from the occupant side, at least one of the plurality of tethers is provided near the 12 o'clock position and the other tethers are provided between the 3 o'clock and 9 o'clock positions.

4. The vehicle airbag device according to claim 3, wherein the lower tether provided near the 12 o'clock position is shorter than the other tethers.

5. The vehicle airbag device according to claim 4, wherein the structure is a steering wheel of a vehicle;

the inflator is provided at a center portion of the steering wheel; and the airbag cushion is rolled or folded, and stored in the center portion.

6. The vehicle airbag device according to claim 3, wherein the plurality of tethers have the same length.

7. The vehicle airbag device according to claim 1, wherein the one or more tethers are a plurality of tethers; and the plurality of tethers are provided at positions that divide the periphery of the inflator into 3 equal parts.

8. The vehicle airbag device according to claim 7, wherein, when the inflator is viewed as a clock from the occupant side, at least one of the plurality of tethers is provided near the 12 o'clock position and the other tethers are provided between the 3 o'clock and 9 o'clock positions.

9. The vehicle airbag device according to claim 8, wherein the lower tether provided near the 12 o'clock position is shorter than the other tethers.

10. The vehicle airbag device according to claim 8, wherein the plurality of tethers have the same length.

11. The vehicle airbag device according to claim 1, wherein the one or more tethers are a plurality of tethers; and the plurality of tethers are provided facing each other with the inflator as a center.

12. The vehicle airbag device according to claim 11, wherein the plurality of tethers are provided near the 12 o'clock position and near the 6 o'clock position, when the inflator is viewed as a clock from the occupant side.

13. The vehicle airbag device according to claim 11, wherein the plurality of tethers are provided near the 3 o'clock position and near the 9 o'clock position, when the inflator is viewed as a clock from the occupant side.

14. The vehicle airbag device according to claim 1, wherein a range extending from the side surface of the airbag cushion to at least a portion of the restraining surface is formed by a prescribed side panel;

the side panel includes a plurality of subpanels divided in the circumferential direction of the side surface;

each of the plurality of subpanels contains:

a pair of side edges joined to adjacent subpanels;

a first edge on the restraining surface side; and a second edge on the bottom surface side; and the pair of side edges are joined to adjacent subpanels by sewing along an imaginary line connecting the geometric center of the inflator and the center of the head of the occupant during inflation and deployment of the airbag cushion.

15. The vehicle airbag device according to claim 14, wherein the first edge on the restraining surface side is shorter than the second edge on the bottom surface side.

16. A vehicle airbag device, containing an airbag cushion that is inflated and deployed between a structure in a vehicle cabin and an occupant seated in a seat in the event of an emergency, and an inflator that is installed on the structure, the airbag cushion comprising:

a bottom surface into which the inflator is inserted;

a restraining surface on an occupant side;

a side surface connecting the bottom surface and the restraining surface;

a recess part formed in a prescribed range at a center of the restraining surface recessed toward the bottom surface; and one or more tethers extending between the recess part and the bottom surface;

wherein the recess part is pulled toward the bottom surface by the tether during the inflation and deployment, the airbag cushion further comprising:

a plurality of folds formed on an inner wall of the recess part during inflation and deployment; and a plurality of restraining parts formed radially so as to divide the inner wall in an inner circumferential direction by the plurality of folds during inflation and deployment, wherein a range extending from the side surface of the airbag cushion to at least a portion of the restraining surface is formed by a prescribed side panel;

the side panel includes a plurality of subpanels divided in the circumferential direction of the side surface;

each of the plurality of subpanels contains:

a pair of side edges joined to adjacent subpanels;

a first edge on the restraining surface side; and a second edge on a bottom surface side; and the pair of side edges are joined to adjacent subpanels by sewing along an imaginary line connecting the geometric center of the inflator and the center of the head of the occupant during inflation and deployment of the airbag cushion.

17. The vehicle airbag device according to claim 16, wherein the first edge on the restraining surface side is shorter than the second edge on the bottom surface side.

* * * * *